US012789815B2

(12) United States Patent
Kanda et al.

(10) Patent No.: US 12,789,815 B2
(45) Date of Patent: Nov. 10, 2026

(54) POSITION ESTIMATION DEVICE AND TRAFFIC CONTROL SYSTEM

(71) Applicant: Mitsubishi Electric Corporation, Tokyo (JP)

(72) Inventors: Yoshiki Kanda, Tokyo (JP); Hiroshi Yamada, Tokyo (JP); Takayuki Tanaka, Tokyo (JP); Kohei Mori, Tokyo (JP); Nariaki Takehara, Tokyo (JP); Keisuke Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 289 days.

(21) Appl. No.: 18/582,894

(22) Filed: Feb. 21, 2024

(65) Prior Publication Data

US 2024/0351587 A1 Oct. 24, 2024

(30) Foreign Application Priority Data

Apr. 13, 2023 (JP) ................................ 2023-065395

(51) Int. Cl.
*B60W 40/00* (2006.01)
*B60W 40/04* (2006.01)
(Continued)

(52) U.S. Cl.
CPC ........ *B60W 40/04* (2013.01); *B60W 50/0097* (2013.01); *B60W 60/001* (2020.02); (Continued)

(58) Field of Classification Search
USPC .......................................................... 701/23
See application file for complete search history.

(56) References Cited

U.S. PATENT DOCUMENTS 10,558,872 B2 * 2/2020 Jin ............................ G01S 5/16
11,143,515 B2 * 10/2021 Schreier ................ B60W 40/02
(Continued)

FOREIGN PATENT DOCUMENTS

JP 7034379 B2 3/2022
JP 2022-118535 A 8/2022
(Continued)

OTHER PUBLICATIONS

Communication dated Sep. 30, 2025 in Japanese Application No. 2023-065395.

*Primary Examiner* — Jonathan M Dager
(74) *Attorney, Agent, or Firm* — Sughrue Mion, PLLC

(57) ABSTRACT

Information about a present position and a posture of an own vehicle for performing desired vehicle operation control is estimated with high accuracy even if the vehicle is not mounted with any satellite positioning sensor. This position estimation device includes: an information reception unit which receives surrounding environment information including first mobile object information including at least a position, an angle, and a speed of a mobile object and road information about a surrounding of the mobile object; a recognition unit which unifies pieces of the surrounding environment information so as to create unification environment information; and an information transmission unit which transmits the unification environment information including positional information about the mobile object to the mobile object.

12 Claims, 21 Drawing Sheets

(51) Int. Cl.
*B60W 50/00* (2006.01)
*B60W 60/00* (2020.01)
*G08G 1/01* (2006.01)

(52) U.S. Cl.
CPC ....... *G08G 1/0116* (2013.01); *B60W 2552/53* (2020.02); *B60W 2554/4041* (2020.02)

(56) References Cited

U.S. PATENT DOCUMENTS 11,536,573 B2* 12/2022 Rolf .................... G01C 21/3896
11,545,034 B2* 1/2023 Pfadler ................ G05D 1/0246
12,184,408 B2* 12/2024 Nekoui ............... H04L 63/1441
12,222,207 B2* 2/2025 Daikoku ................ G01C 21/30
12,545,274 B2* 2/2026 Ropel ................... B60W 50/12
12,610,216 B2* 4/2026 Lee ......................... H04W 4/12
2010/0198513 A1* 8/2010 Zeng ..................... G01S 13/931 701/300
2013/0120159 A1* 5/2013 Stahlin ................... G08G 1/161 340/902
2015/0286754 A1* 10/2015 Stählin .................... G06F 30/20 703/6
2017/0236419 A1* 8/2017 Grewe ................. G06V 20/582 340/870.07
2018/0053060 A1* 2/2018 Huang ................... G08G 1/167
2020/0111363 A1 4/2020 Maeda et al.
2020/0173802 A1* 6/2020 Thunga Gopal ... G01C 21/3492
2020/0191578 A1* 6/2020 Körner ............... G01C 21/3811
2021/0065551 A1* 3/2021 Manohar ................ B60Q 9/008
2022/0082390 A1 3/2022 Kameoka et al.
2022/0343761 A1* 10/2022 Bandi .................. G08G 1/0145
2022/0371597 A1 11/2022 Narui et al.
2023/0182729 A1* 6/2023 Bandi ................... G06F 18/214
2023/0319761 A1* 10/2023 Baek ..................... H04L 5/0051 455/456.1
2023/0415756 A1* 12/2023 Komar .............. B60W 50/0205
2024/0080366 A1* 3/2024 Edwards ............... H04L 67/131
2025/0020754 A1* 1/2025 Jang ........................ G01S 5/011

FOREIGN PATENT DOCUMENTS

WO 2018/235154 A1 12/2018
WO 2021/085030 A1 5/2021

* cited by examiner

POSITION ESTIMATION DEVICE AND TRAFFIC CONTROL SYSTEM

BACKGROUND OF THE INVENTION

1. Field of the Invention

The present disclosure relates to a position estimation device and a traffic control system.

2. Description of the Background Art

In recent years, development of automated driving technologies for automobiles has been actively conducted. In order to perform desired vehicle operation control during operation that includes but is not limited to automated driving, information about a present position and a posture of the vehicle needs to be acquired with high accuracy. A position estimation device is a device for estimating the present position and the posture of the vehicle.

There is a satellite positioning method as a method for estimating the present position and the posture of the vehicle by using the position estimation device. The satellite positioning method involves performing position estimation by using a satellite positioning device mounted to the vehicle. However, in the case of employing the satellite positioning method, a sensor error needs to be corrected when satellite positioning is unstable. For example, Patent Document 1 describes correcting an error of a satellite positioning sensor at the time of position estimation, by employing the satellite positioning method not alone but in combination with another method such as a method for calculating the relative position between a feature and a vehicle or a method in which information such as road line shape data is used.

In addition, Patent Document 2 discloses technologies in which an error of a satellite positioning sensor in each of own vehicles is compensated for from any vehicle, among other vehicles, in which a satellite positioning sensor has a small error. Patent Document 2 further describes that, from the other vehicle in which the satellite positioning sensor has a small error, the relative position of the own vehicle is communicated between the vehicles so that estimation positions of the own vehicles are identified and corrected in a relayed manner.

Patent Document 1: Japanese Patent No. 7034379

Patent Document 2: Japanese Laid-Open Patent Publication No. 2022-118535

A satellite positioning sensor is expensive, and furthermore, in the technologies disclosed in Patent Document 1, employment of another method in combination might be unavoidable even if such an expensive satellite positioning sensor is mounted to the vehicle. In addition, at the time of estimating an own position through dead reckoning, there is a limitation in the accuracy of the estimation. Further, in the technologies disclosed in Patent Document 2, a present position and a posture of any of the vehicles cannot be accurately or stably estimated unless an expensive satellite positioning sensor is mounted to at least one vehicle among the other vehicles.

SUMMARY OF THE INVENTION

The present disclosure has been made to solve the above problem, and an object of the present disclosure is to provide a position estimation device and a traffic control system in which information about a present position and a posture of an own vehicle for performing desired vehicle operation control can be estimated with high accuracy even if the vehicle is not mounted with any satellite positioning sensor.

A position estimation device according to the present disclosure includes:

an information reception unit which receives, from each of a plurality of environment information acquisition devices, surrounding environment information including first mobile object information including at least a position, an angle, and a speed of a mobile object and road information including at least information about a white line near the mobile object;

a recognition unit which unifies received pieces of the surrounding environment information so as to create unification environment information including positional information about the mobile object;

an information recording unit which records the surrounding environment information including the first mobile object information and the road information received by the information reception unit, and the unification environment information created by the recognition unit; and an information transmission unit which transmits the unification environment information created by the recognition unit to the mobile object.

According to the present disclosure, information about a present position and a posture of an own vehicle for performing desired vehicle operation control can be estimated with high accuracy even if the vehicle is not mounted with any satellite positioning sensor.

DETAILED DESCRIPTION OF THE PREFERRED EMBODIMENTS OF THE INVENTION

Figure 1:
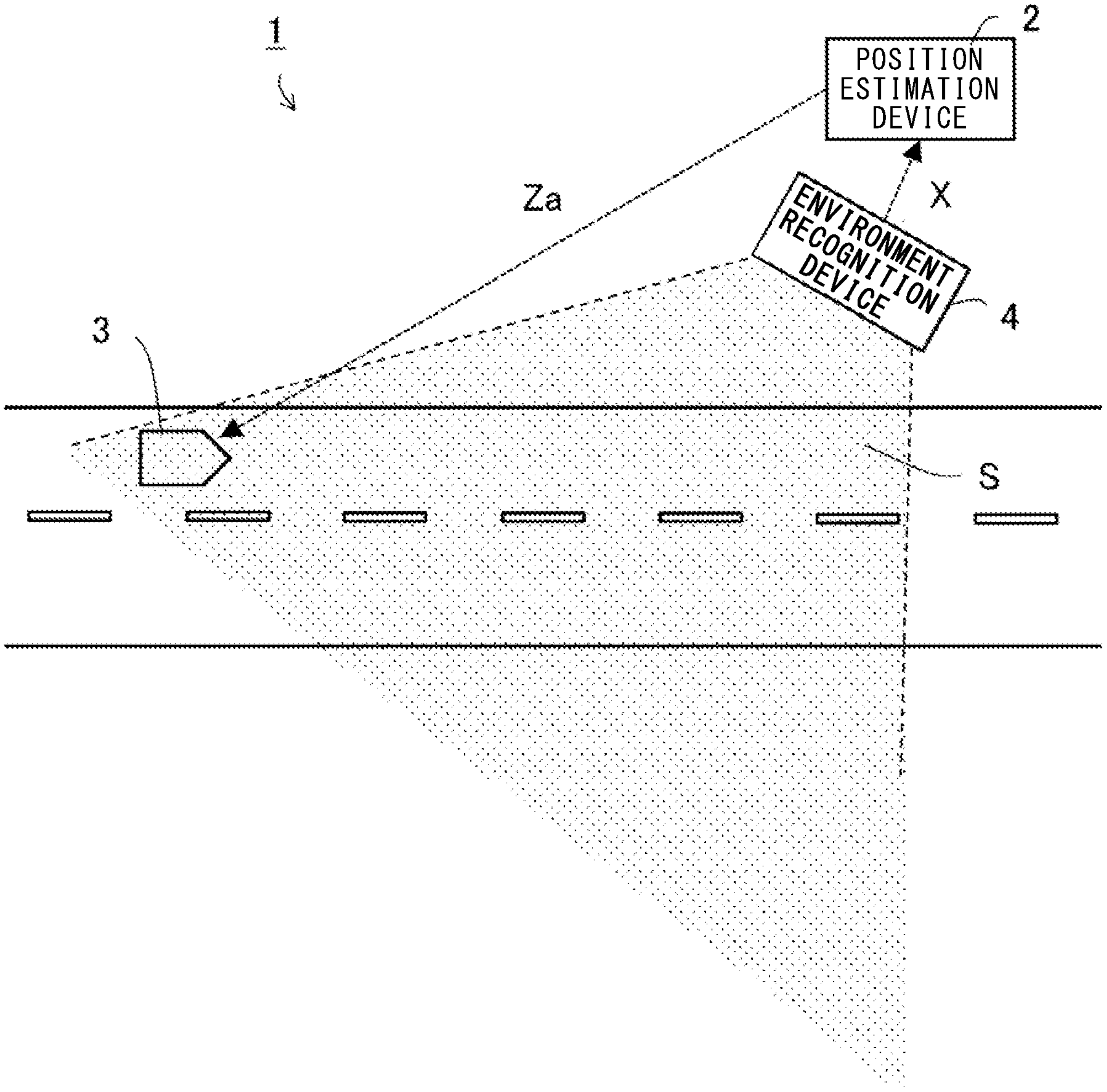
FIG. 1 shows a configuration of a traffic control system according to a first embodiment.

Hereinafter, position estimation devices and traffic control systems according to embodiments of the present disclosure will be described with reference to the drawings. In the following embodiments, description will be given by taking an automobile as an example of a mobile object which is a control-target object to which each position estimation device and the corresponding traffic control system are applied. In the drawings, the same or corresponding parts are denoted by the same reference characters. Therefore, detailed descriptions about these parts are sometimes omitted in order to avoid redundancy.

First Embodiment

A position estimation device and a traffic control system according to a first embodiment will be described below with reference to the drawings.

<Configuration of Traffic Control System>

Figure 2:
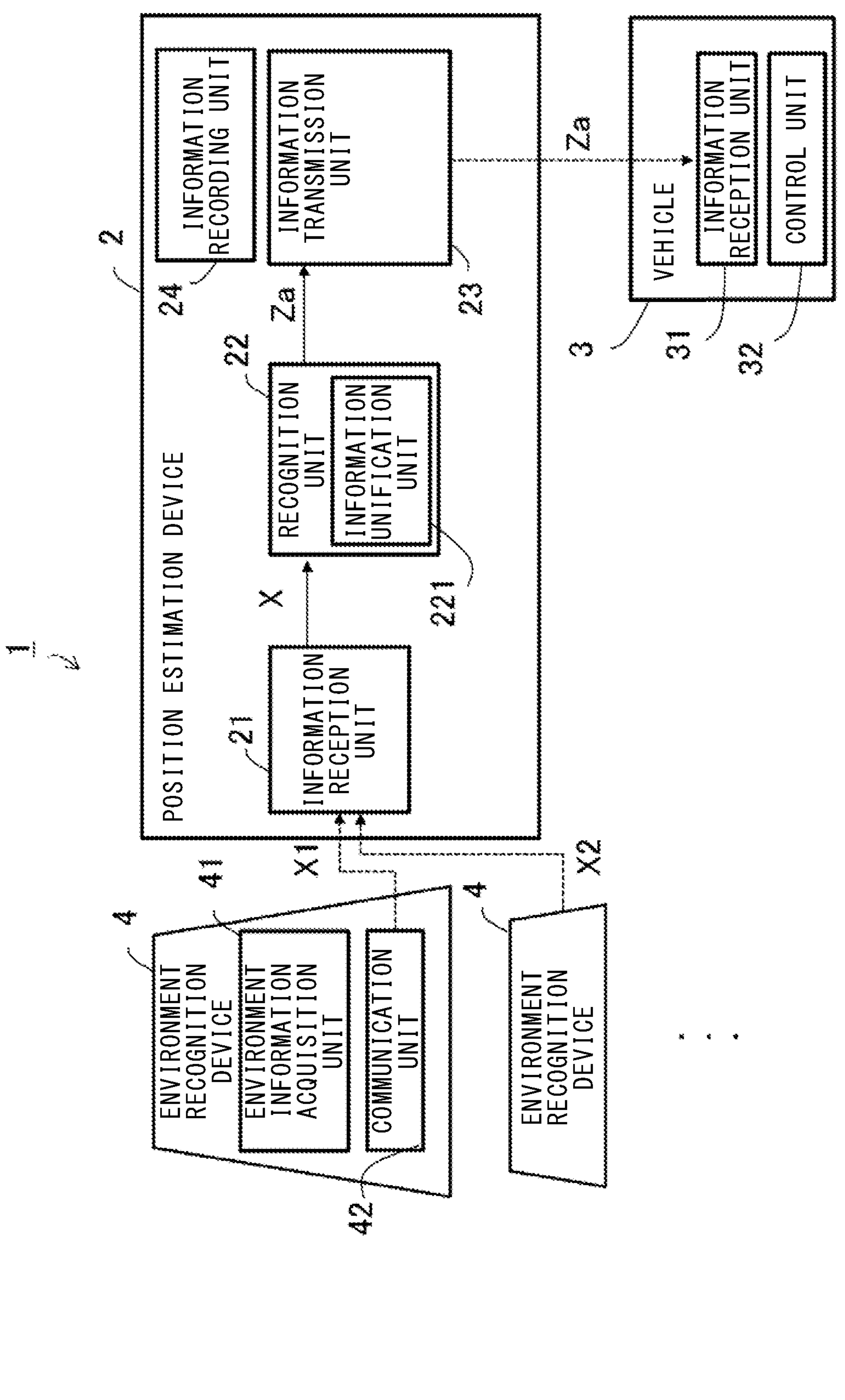
FIG. 2 is a function block diagram of each constituent of the traffic control system according to the first embodiment.

FIG. 1 shows a configuration of the traffic control system according to the first embodiment, and FIG. 2 is a function block diagram of each constituent composing the traffic control system. A traffic control system 1 includes: a vehicle 3 which is a control-target object; an environment recognition device 4 installed on the roadside of a route on which the vehicle 3 travels; and a position estimation device 2 which receives surrounding environment information X about the vehicle 3 from the environment recognition device 4, generates unification environment information Za from pieces of the surrounding environment information X, and transmits the unification environment information Za to the vehicle. Although only one environment recognition device 4 is shown in FIG. 1, a plurality of the environment recognition devices 4 may be provided as shown in FIG. 2. In FIG. 1, a region that is hatched with dots and that is located within broken lines indicates a detection range S of the environment recognition device 4, solid lines located upward and downward of the vehicle 3 delimit respective lanes, and an outlined white broken line indicates a center line between the lanes.

<Configuration of Environment Recognition Device 4>

The environment recognition device 4 is provided with: at least one of a camera, a light detection and ranging sensor (LiDAR), a millimeter-wave radar, and the like as a sensor which is an environment information acquisition unit 41; and a communicator as a communication unit 42.

The camera acquires, from a taken image, information indicating an environment in which the vehicle 3 is present, such as information about the vehicle 3 and information about a lane and an obstacle near the vehicle 3.

The LiDAR radiates laser light and detects a time difference that the laser light takes to return to the LiDAR after being reflected by an object, thereby detecting the position of the object within the detection range.

The millimeter-wave radar radiates a millimeter wave and detects a reflected wave thereof, thereby measuring a relative distance to and a relative speed of an object existing within the detection range. The millimeter-wave radar outputs the result of the measurement.

A sonar sensor radiates an ultrasonic wave to the surrounding of an own vehicle and detects a time difference that the ultrasonic wave takes to return to the sonar sensor after being reflected by a nearby object, thereby detecting a position of and a distance to the object that exists.

The environment recognition device 4 acquires, in real time, information about the vehicle 3 and information about the shape, the type, the position, the posture, the speed, and the like of another object, within the detection range S of the above sensor, and transmits these pieces of information as the surrounding environment information X to the position estimation device 2. In FIG. 2, pieces of the surrounding environment information acquired by two respective environment recognition devices 4 are indicated as pieces of surrounding environment information X1 and X2.

<Configuration of Vehicle 3>

The vehicle 3 which is a control-target object is a vehicle including: an information reception unit 31 which receives information transmitted from the position estimation device 2; and a vehicle travel system which is a control unit 32 for controlling travel of the vehicle 3. In addition, on the basis of the unification environment information Za transmitted from the position estimation device 2, the vehicle 3 acquires an own position of the vehicle and performs desired operation control. In the following description, processing inside the vehicle 3 will not be explained in detail.

<Configuration of Position Estimation Device 2>

The position estimation device 2 collects, as information about each vehicle 3, control object information about the vehicle and environment information about the surrounding of the vehicle being operated. Here, the "control object information" includes at least the position, the posture (orientation), and the speed of each vehicle recognized by the environment recognition device 4 which are obtained from the surrounding environment information X. The "environment information" is road information including at least information about a white line and obtained from the surrounding environment information X, and includes information about a center line, a road width, a white line, the curvature of the road, and the like.

As shown in FIG. 2, the position estimation device 2 includes: an information reception unit 21 which receives pieces of information transmitted from the environment recognition devices 4; a recognition unit 22 which unifies acquired pieces of the surrounding environment information X through the sensor fusion technique which is a publicly-known technique; an information transmission unit 23 which transmits the unification environment information including at least information about the position and the posture of a transmission-destination vehicle 3, to the vehicle 3; and an information recording unit 24 which records at least the information about the position and the posture of each of detected vehicles, each determination result, a reason for the determination, and the like.

The information reception unit 21 receives pieces of the surrounding environment information X (respectively X1, X2, . . . ) from one or a plurality of the environment recognition devices 4. The recognition unit 22 unifies the received pieces of surrounding environment information X through a publicly-known technique by means of an information unification unit 221. To the environment information obtained by the unification, at least positional information including the type, the position, and the angle of the vehicle has been added. That is, the environment information obtained by the unification includes the positional information about the vehicle. In this manner, in a case where there are a plurality of the environment recognition devices 4, unification of pieces of the surrounding environment information X is performed in the recognition unit 22 of the position estimation device 2. The information transmission unit 23 transmits the unification environment information Za obtained by the unification in the recognition unit 22 to the vehicle 3.

On the basis of the unification environment information Za transmitted from the position estimation device 2, the vehicle 3 acquires an own position and a posture and performs desired operation control by means of the control unit 32.

<Operation of Position Estimation Device 2>

Next, operation of the position estimation device 2 will be described with reference to the flowchart in FIG. 3.

First, in step S101, the position estimation device 2 collects pieces of surrounding environment information X (surrounding information collection step). Specifically, the information reception unit 21 of the position estimation device 2 receives pieces of surrounding environment information X acquired by sensors which are the environment information acquisition units 41 of the environment recognition devices 4 installed on the roadside.

Next, in step S102, the information unification unit 221 unifies the pieces of surrounding environment information X through a publicly-known technique (information unification step). Consequently, the pieces of object information from the plurality of environment recognition devices 4 are unified, whereby information with a higher accuracy can be obtained.

Next, in step S103, the unification environment information Za obtained by unifying the pieces of surrounding environment information is transmitted to each of vehicles 3.

Figure 3:
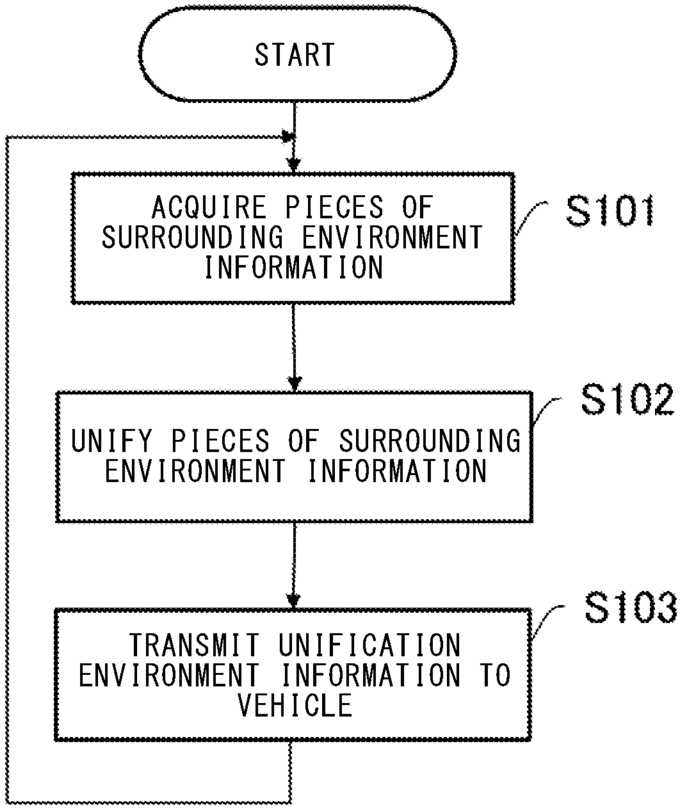
FIG. 3 is a flowchart showing operation of a position estimation device according to the first embodiment.

The position estimation device 2 repeatedly executes the flow shown in FIG. 3 in a predetermined cycle (for example, 1 second).

In this manner, the pieces of surrounding environment information X acquired by the environment recognition devices 4 are unified in the position estimation device 2, and the resultant information is received as information including positional information about the vehicle. Consequently, even if the vehicle 3 is not mounted with any satellite positioning sensor, the vehicle 3 can acquire, with high accuracy, information about a present position and a posture of the own vehicle for performing desired operation control.

The environment recognition devices 4 only have to be arranged in a tunnel, between buildings, or at other locations, to be able to also estimate, in the present embodiment, a vehicle position that would be difficult to acquire with a satellite positioning sensor.

<Hardware Configuration of Position Estimation Device 2>

Figure 4:
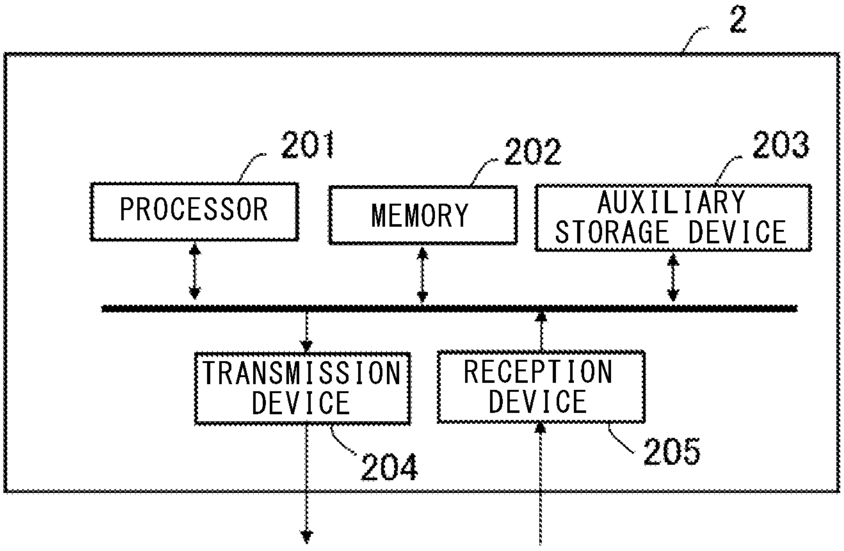
FIG. 4 is a hardware configuration diagram of the position estimation device according to the first embodiment.

Next, a hardware configuration of the position estimation device 2 will be described. FIG. 4 shows an example of the hardware configuration for implementing the position estimation device 2 according to the first embodiment. The position estimation device 2 is provided with a processor 201, a memory 202 as a main storage device, and an auxiliary storage device 203. The processor 201 is implemented by, for example, a central processing unit (CPU), an application specific integrated circuit (ASIC), a digital signal processor (DSP), a field programmable gate array (FPGA), or the like.

The memory 202 is implemented by a volatile storage device such as a random access memory, and the auxiliary storage device 203 is implemented by a nonvolatile storage device such as a flash memory, a hard disk, or the like. The auxiliary storage device 203 stores therein a predetermined program to be executed by the processor 201, and the processor 201 reads and executes the program as appropriate, to perform various computation processes. At this time, the above predetermined program is temporarily saved from the auxiliary storage device 203 into the memory 202, and the processor 201 reads the program from the memory 202. The various computation processes of the control system in the first embodiment are accomplished through execution of the predetermined program by the processor 201 as described above. The results of the execution of the computation processes by the processor 201 are temporarily stored in the memory 202 and are, according to the purposes of the executed computation processes, stored in the auxiliary storage device 203.

Further, a transmission device 204 and a reception device 205 are provided as communication modules for communication with each vehicle 3 and each environment recognition device 4.

Also, the vehicle 3 and the environment recognition device 4 may also each have a hardware configuration in which a processor 201, a memory 202 as a main storage device, and an auxiliary storage device 203 are provided in the same manner.

As described above, the position estimation device according to the first embodiment includes: an information reception unit which receives, from each of a plurality of environment recognition devices installed on the roadside, control object information and environment information as surrounding environment information, the control object information being mobile object information including at least a position, an angle, and a speed of a vehicle which is a mobile object, the environment information including road information about the surrounding of the vehicle; a recognition unit which unifies pieces of the environment information so as to create unification environment information; an information recording unit which records the control object information and the environment information received by the reception unit, and the unification environment information created by the recognition unit; and an information transmission unit which transmits, as information including positional information about the vehicle, the unification environment information created by the recognition unit to the mobile object. Consequently, the own-vehicle position can be estimated with high accuracy from the unification environment information even if the vehicle itself is not mounted with any expensive sensor such as a satellite positioning sensor.

In addition, the traffic control system includes a vehicle, environment recognition devices, and the above position estimation device. Thus, when pieces of information acquired from the environment recognition devices are unified in the position estimation device and the resultant information is provided to the vehicle, the vehicle can estimate, with high accuracy, an own-vehicle position and an angle (posture) with use of which the vehicle can stably travel.

Second Embodiment

A position estimation device and a traffic control system according to a second embodiment will be described below with reference to the drawings. The same descriptions as those of the first embodiment are not repeated.

<Configuration of Traffic Control System>

Figure 5:
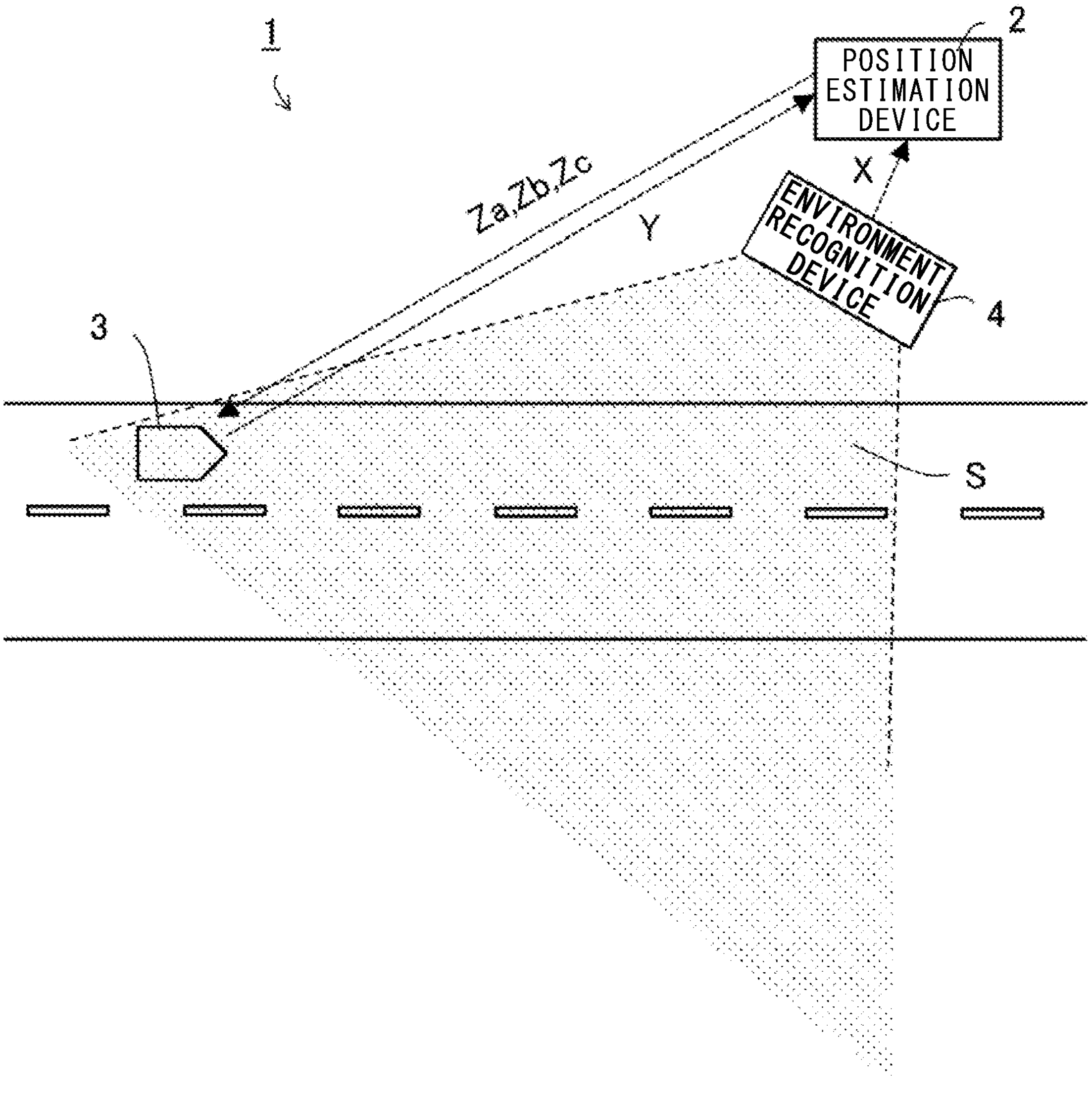
FIG. 5 shows a configuration of a traffic control system according to a second embodiment.
Figure 6:
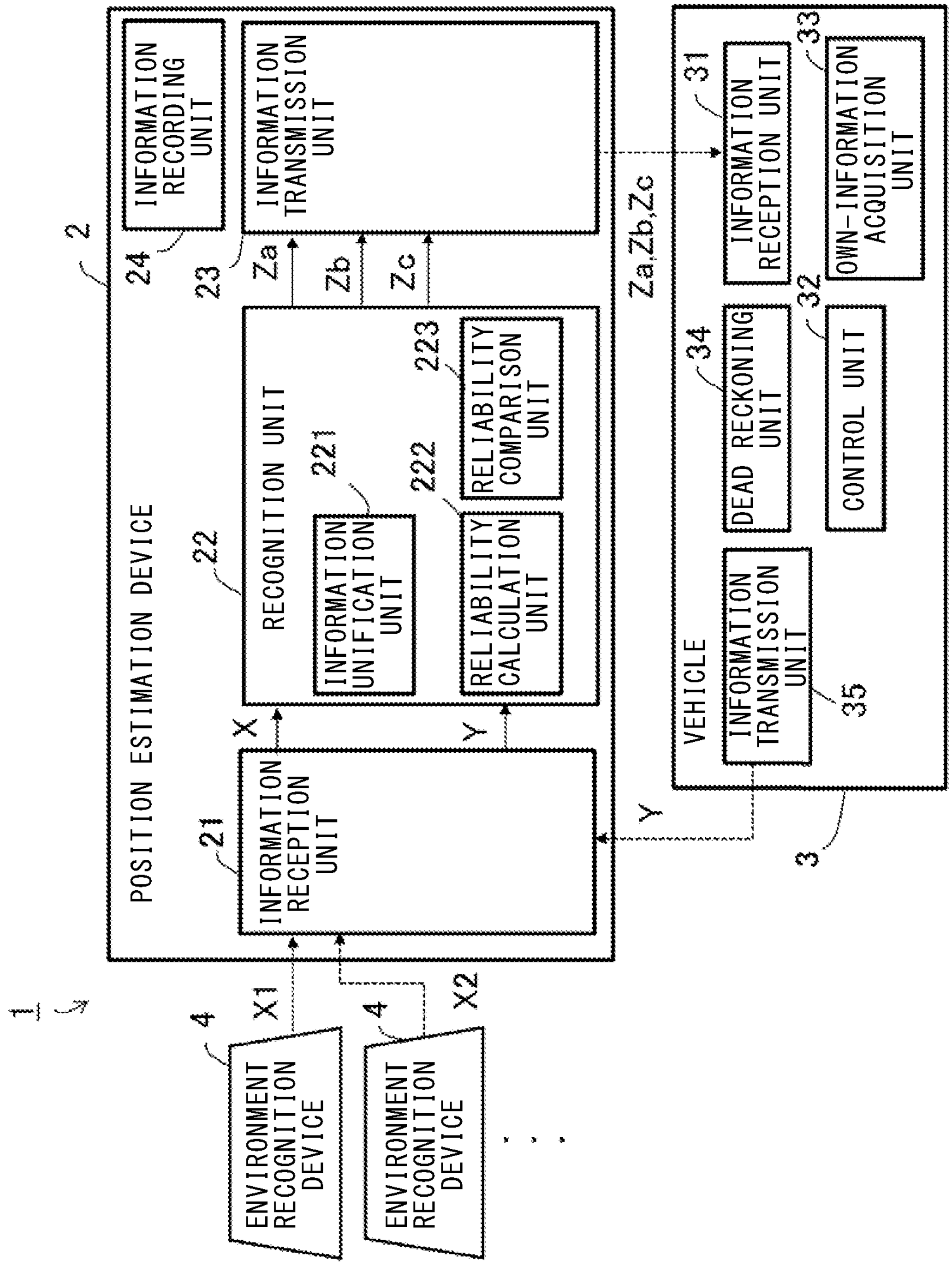
FIG. 6 is a function block diagram showing each constituent of the traffic control system according to the second embodiment.

FIG. 5 shows a configuration of the traffic control system according to the second embodiment, and FIG. 6 is a function block diagram of each functional unit composing the traffic control system. In FIG. 5, similar to the first embodiment, the traffic control system 1 includes the vehicle 3, the environment recognition device 4, and a position estimation device 2. A difference from the first embodiment is that the position estimation device 2 receives control object information Y as vehicle information from the vehicle 3, generates the unification environment information Za obtained by unifying pieces of surrounding environment information X, reliability information Zb about the surrounding environment information X and the control object information Y, and correction information Zc, and transmits these pieces of information Za, Zb, and Zc to the vehicle 3. The configuration of each environment recognition device 4 is the same as that in the first embodiment.

<Configuration of Vehicle 3>

The vehicle 3 includes: the information reception unit 31 which receives each of the pieces of information transmitted from the position estimation device 2; a dead reckoning unit 34 which reckons a position advanced from a certain position; the vehicle travel system which is the control unit 32 for controlling travel of the vehicle 3; an own-information acquisition unit 33 which acquires own-vehicle information including at least a target route, a target vehicle speed, an own-vehicle position, and a posture; and an information transmission unit 35 which transmits, to the position estimation device 2, the control object information Y which is the own-vehicle information. In addition, on the basis of the unification environment information Za, the reliability information Zb, and the correction information Zc corresponding to a reliability which have been transmitted from the position estimation device 2, the vehicle 3 corrects the own position of the vehicle as appropriate and performs desired operation control. However, explanations of processing inside the vehicle 3 are omitted in the following description.

<Configuration of Position Estimation Device 2>

The position estimation device 2 collects, as information about each vehicle 3, control object information about the vehicle and environment information about the surrounding of the vehicle being operated. The "control object information" mentioned here includes at least the target route, the target vehicle speed, the own-vehicle position, and the posture transmitted from the vehicle 3. Meanwhile, similar to the first embodiment, the "environment information" mentioned here includes, in addition to the position, the posture, and the speed of each vehicle recognized by the environment recognition device 4 which are obtained from the surrounding environment information X, information about a center line, a road width, a white line, and the curvature of the road as road information including at least information about a white line and obtained from the surrounding environment information X.

As shown in FIG. 6, the position estimation device 2 includes: the information reception unit 21 which receives pieces of information transmitted from the environment recognition devices 4 and the vehicle 3; the recognition unit 22 which unifies acquired pieces of the surrounding environment information X through the sensor fusion technique which is a publicly-known technique; the information transmission unit 23 which transmits the environment information obtained by the unification to the vehicle 3; and the information recording unit 24 which records at least the information about the position and the posture of each of detected vehicles, each determination result, a reason for the determination, and the like.

The information reception unit 21 receives pieces of the surrounding environment information X from one or a plurality of the environment recognition devices 4 and receives pieces of the control object information Y each including at least target routes, target vehicle speeds, vehicles' target speeds, own-vehicle positions, and postures from one or a plurality of the vehicles 3.

The recognition unit 22 unifies the received pieces of surrounding environment information X through a publicly-known technique by means of the information unification unit 221. To the environment information obtained by the unification, at least information about the type of each vehicle and information about the position and the angle of the vehicle have been added. In this manner, in the case where there are a plurality of the environment recognition devices 4, unification of pieces of the surrounding environment information X is performed in the recognition unit 22 of the position estimation device 2. In addition, in the recognition unit 22, a reliability calculation unit 222 calculates, from each piece of surrounding environment information obtained from the corresponding sensor, a reliability indicating the accuracy and the dependability of the information obtained by the sensor. In addition, the reliability calculation unit 222 calculates a reliability indicating the accuracy and the dependability of each piece of control object information Y which is vehicle information acquired from the corresponding vehicle 3. A reliability comparison unit 223 compares the calculated reliabilities with each other and determines which information is most reliable. The reliability comparison unit 223 selects, according to the result of the determination, content of correction information to be transmitted to the vehicle. The information transmission unit 23 transmits, to the vehicle 3, the unification environment information Za obtained through unification by the information unification unit 221, the reliability information Zb calculated by the reliability calculation unit 222, and the correction information Zc corresponding to the reliability.

On the basis of the unification environment information Za, the reliability information Zb, and the correction information Zc transmitted from the position estimation device 2, the vehicle 3 corrects the position and the posture of its own and performs desired operation control by means of the control unit 32.

<Operation of Position Estimation Device 2>

Next, operation of the position estimation device 2 will be described with reference to the flowchart in FIG. 7. The same operations as those in FIG. 3 regarding the first embodiment will be described in a simplified manner.

First, in step S201, the position estimation device 2 collects pieces of surrounding environment information X (surrounding information collection step) in the same manner as in step S101 in the first embodiment.

Next, in step S202, vehicle information as the control object information Y transmitted from the vehicle 3 and including at least a target route, a target vehicle speed, a vehicle's target speed, an own-vehicle position, and a posture is received (vehicle information collection step).

Next, in step S203, the information unification unit 221 unifies the pieces of surrounding environment information X through a publicly-known technique (information unification step) in the same manner as in step S102 in the first embodiment. Consequently, the pieces of object information from the plurality of environment recognition devices 4 are unified, whereby information with a higher accuracy can be obtained.

Next, in step S204, a reliability for each environment recognition device 4 or each sensor, and reliabilities of pieces of the control object information Y, are calculated (reliability calculation step). The reliability calculation will be described later. The environment recognition device 4 or the sensor provided thereto is sometimes referred to as an "environment information acquisition device".

Next, in step S205, the calculated reliabilities are compared with each other, determination is performed as to which environment recognition device 4 or sensor (environment information acquisition device) has the highest reliability or as to which control object information Y has the highest reliability, and the position estimation result having the highest reliability is selected as information to be transmitted to the vehicle 3 (reliability comparison step).

Next, in step S206, whether or not correction information to be transmitted to the vehicle 3 is necessary is determined (correction information creation determination step). Whether or not correction information is necessary is determined as follows on the basis of, for example, the result of the reliability comparison step. That is, when the value of the highest reliability is smaller than a preset first reference value (No in step S206), it is determined to create correction information, and the process advances to step S207.

When the value of the highest reliability is smaller than the preset first reference value and it is determined to create correction information in the correction information creation determination step, correction information Zc to be transmitted to the vehicle 3 is created in step S207 (correction information creation step). Examples of an operation that creation of the correction information Zc involves include transmission of information about an area in which the vehicle 3 exists. However, no limitation to the above example is made. Thereafter, the process advances to step S208.

Meanwhile, when, in step S206, the value of the highest reliability is equal to or larger than the preset first reference value and it is determined that creation of correction information is unnecessary in the correction information creation determination step (Yes in step S206), the process advances to step S208.

In step S208, the pieces of information, i.e., the unification environment information Za obtained by unifying the pieces of surrounding environment information, the positional information having the highest reliability, the reliability information Zb, and, as necessary, the correction information Zc, are transmitted to each vehicle 3.

Figure 7:
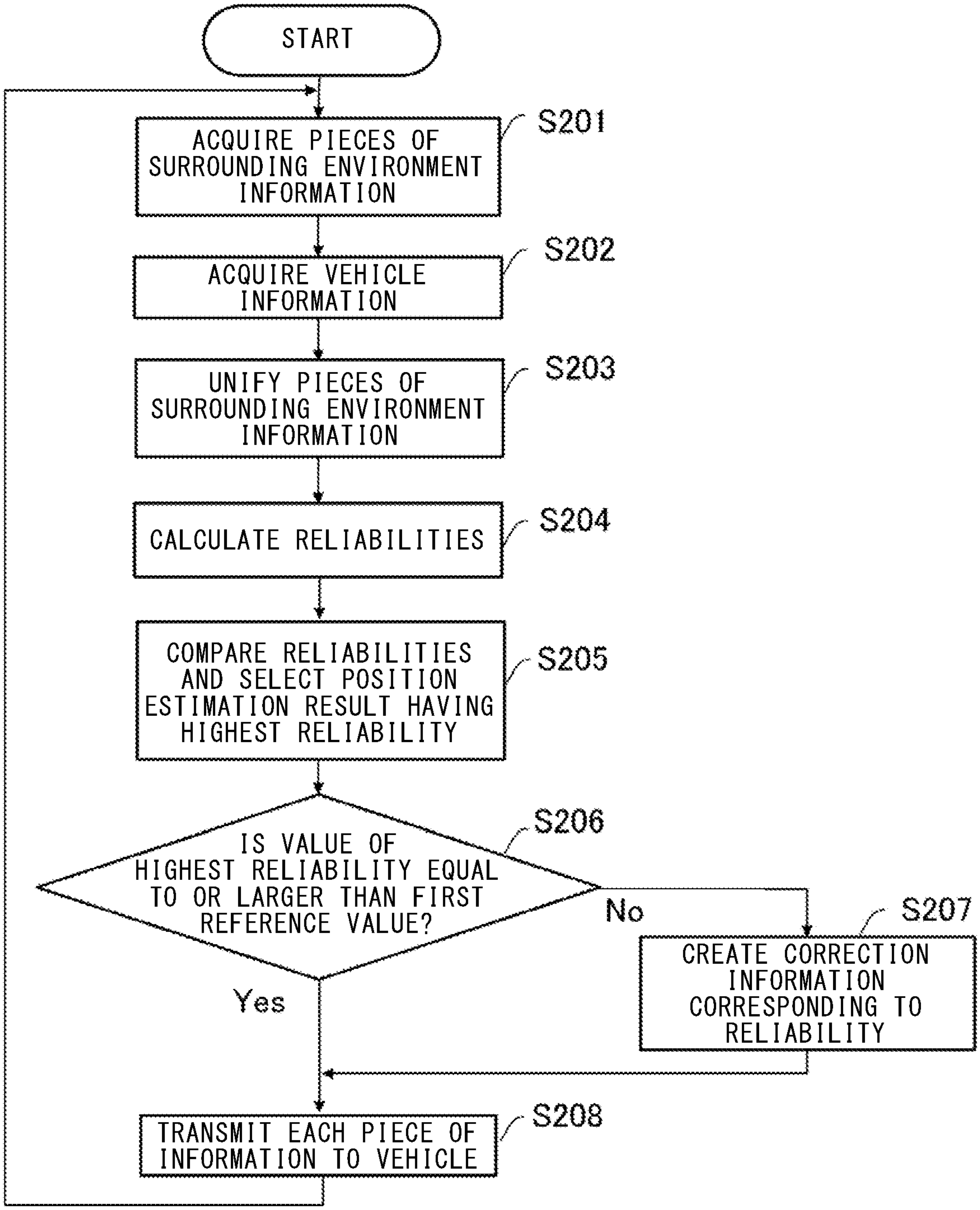
FIG. 7 is a flowchart showing operation of a position estimation device according to the second embodiment.

The position estimation device 2 repeatedly executes the flow shown in FIG. 7 in a predetermined cycle (for example, 1 second).

<Method for Calculating Reliability Information Zb>

Next, a method for calculating a reliability in the reliability calculation step, i.e., step S204, will be described with an example in which the sensor provided to each environment recognition device 4 is a LiDAR. In the present disclosure, the reliability is a value indicating how close to a true value the value of information acquired by the sensor is, and a higher reliability means that the value of the information is closer to the true value.

Figure 8A:
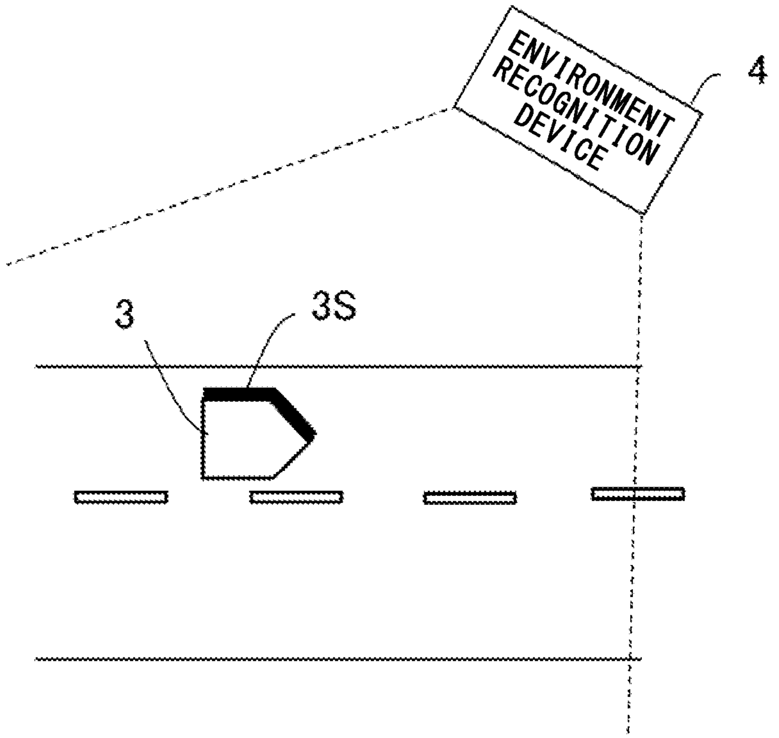
FIG. 8A is a bird's-eye view for explaining reliability calculation, the view showing an example in which a vehicle is traveling along a lane.
Figure 8B:
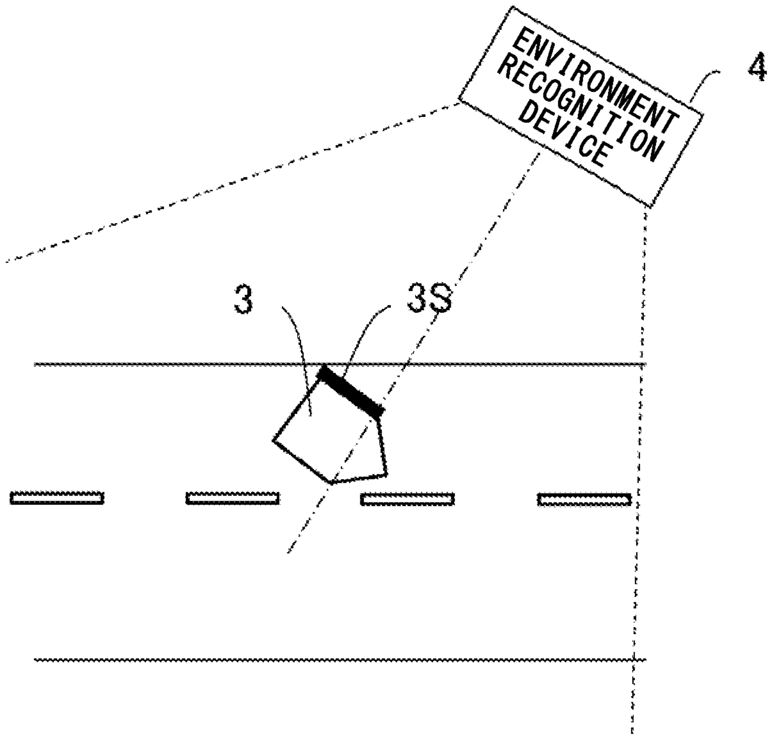
FIG. 8B is a bird's-eye view for explaining reliability calculation, the view showing an example in which the vehicle is oriented obliquely with respect to the lane.
Figure 9A:
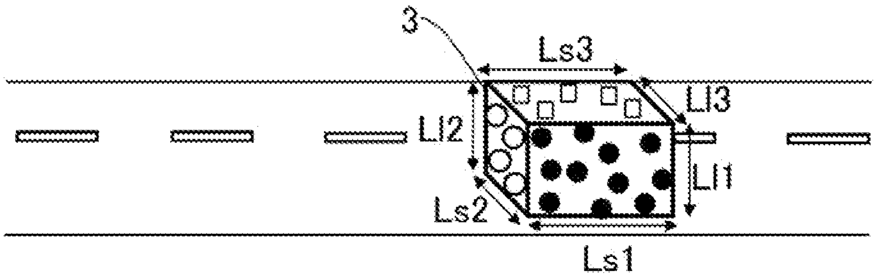
FIG. 9A is a diagram for explaining reliability calculation as seen from an environment recognition device, the diagram corresponding to FIG. 8A.
Figure 9B:
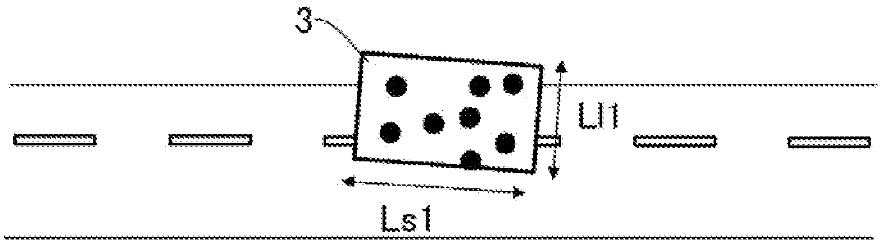
FIG. 9B is a diagram for explaining reliability calculation as seen from the environment recognition device, the diagram corresponding to FIG. 8B.

FIG. 8A is a bird's-eye view for explaining the reliability calculation method, the view showing an example in which the vehicle 3 is traveling on a route along a lane. FIG. 8B is a bird's-eye view for explaining the reliability calculation method, the view showing an example in which the vehicle 3 is oriented obliquely with respect to the lane. FIG. 8A and FIG. 8B show examples with different postures (angles). FIG. 9A and FIG. 9B show states as seen from the environment recognition device 4 and correspond to FIG. 8A and FIG. 8B, respectively. The vehicle 3 seen from the environment recognition device 4 is expressed with a perspective view of a hexahedron for convenience.

In each of FIG. 8A and FIG. 8B, a thick line on a side surface of the vehicle 3 indicates a surface 3S recognized by the environment recognition device. As shown in FIG. 8A and FIG. 9A, in a case where the vehicle 3 is traveling on the route, three surfaces can be recognized from the environment recognition device 4. Meanwhile, as shown in FIG. 8B and FIG. 9B, in a case where the vehicle 3 is oriented obliquely with respect to the lane so that the vehicle 3 is parallel to the environment recognition device 4, i.e., the vehicle 3 is oriented in a direction perpendicular to an axis in the detection direction of the sensor of the environment recognition device 4, only one surface can be recognized from the environment recognition device 4.

In FIG. 9A and FIG. 9B, reflection points are shown on each surface of the vehicle 3 detected by the environment recognition device 4, and the horizontal length and the vertical length of each surface are respectively defined as Lsi and Lli. Specifically, in FIG. 9A and FIG. 9B, reflection points on a surface having a horizontal length Ls1 and a vertical length Ll1 are indicated by black circles •, reflection points on a surface having a horizontal length Ls2 and a vertical length Ll2 are indicated by white circles ○, and reflection points on a surface having a horizontal length Ls3 and a vertical length Ll3 are indicated by quadrangles □. Here, the number of reflection point sets on the vehicle 3 is defined as Npi, i represents the number (maximum number Nf) of detected surfaces of the vehicle, j represents the type of an evaluation method, and the coefficient of weighting is defined as Wj. In FIG. 9A, a reflection point set number Np1 is the total number of the black circles •, a reflection point set number Np2 is the total number of the white circles ○, and a reflection point set number Np3 is the total number of the quadrangles □. In FIG. 9B, the reflection point set number Np1 is the total number of the black circles •.

In the case where, as in the present second embodiment, the sensor is a LiDAR and the reliability is evaluated according to the posture (angle) of the vehicle by using the reflection point set number obtained by the LiDAR, reliabilities Rij of sensors (LiDARs) themselves can be defined by the following expression (1).

[Mathematical 1]

$$R_{ij} = W_j \cdot N_{fi} \cdot \sum \frac{N_{pi}}{L_{si} \cdot L_{li}} \tag{1}$$

No limitation to the example in which the reliability is evaluated in this manner according to the posture (angle) of the vehicle 3 by using the reflection point set number obtained by the LiDAR is made, and the detected distance from the vehicle 3 may be used in combination to evaluate a reliability with respect to the posture (angle) or evaluate a reliability with respect to the detected distance. Also, although evaluation is performed with focus being placed on the side surface of the vehicle in the above example, the front/rear surface may be captured. No limitation to these evaluation methods is made.

Next, a method for calculating a reliability of vehicle positional information in each piece of control object information Y as another reliability will be described.

A time calculated by the dead reckoning unit 34 provided to the vehicle 3 is defined as t(s), the acceleration of the vehicle is defined as at, the gradient of the road on which the vehicle is traveling is defined as St, and the coefficient of weighting is defined as Wk. In the case of employing a method for calculating a reliability in estimation of an own position in the control object information Y performed through dead reckoning, reliabilities Rij of sensors themselves can be defined by the following expression (2).

[Mathematical 2]

$$R_{ij} = 1.0 - W_1 \cdot t - W_2 \cdot \alpha_t - W_2 \cdot S_t \tag{2}$$

Although two examples of the reliability calculation method have been described, the reliability evaluation method and the reliability calculation method are not limited to these examples.

The above reliabilities are calculated by the reliability calculation unit 222 for each reliability evaluation method, for each environment recognition device 4 or sensor, or for each piece of control object information Y, and are unified. There are various unification methods. For example, it is conceivable to average the reliabilities of the respective sensors themselves. If N is defined as the number of sensors mounted to the environment recognition device and Ri is defined as a reliability for each reliability evaluation method or each sensor, a reliability Rall of the environment recognition device 4 or the sensor resulting from unification is obtained according to the following expression (3).

[Mathematical 3]

$$R_{all} = \frac{R_1 + R_2 + R_3 + \ldots + R_N}{N} \tag{3}$$

Likewise, the control object information Y may be averaged, and the reliability Rall of the control object information Y can also be obtained according to expression (3). The calculation method is not limited thereto.

The reliabilities Rall for the respective environment recognition devices 4 or the respective sensors resulting from unification, or the reliabilities Rall of pieces of the control object information Y resulting from unification, are compared with one another. As a result, vehicle information outputted from the environment recognition device 4 or the sensor having the highest reliability, or vehicle information in the control object information Y having the highest reliability, is outputted as positional information. At this time, when the value of the highest reliability is smaller than the preset first reference value, correction information is created according to the granularity of information based on said reliability.

In comparison between the reliabilities, when the calculation time in the dead reckoning unit 34 is short in the example in FIG. 8A and FIG. 9A, the reliability calculated according to expression (2) is higher than the reliability calculated according to expression (1), and it is determined that the reliability is higher than that of any of the other sensors. Thus, it is useful to select a highest reliability through comparison between the reliabilities and output vehicle information outputted from the environment recognition device 4 or the sensor having the highest reliability, or vehicle information in the control object information Y having the highest reliability, in order to obtain a high accuracy of position estimation.

<Method for Creating Correction Information Zc>

Next, a method for creating correction information Zc when the value of the highest reliability is smaller than the preset first reference value will be described.

Figure 10B:
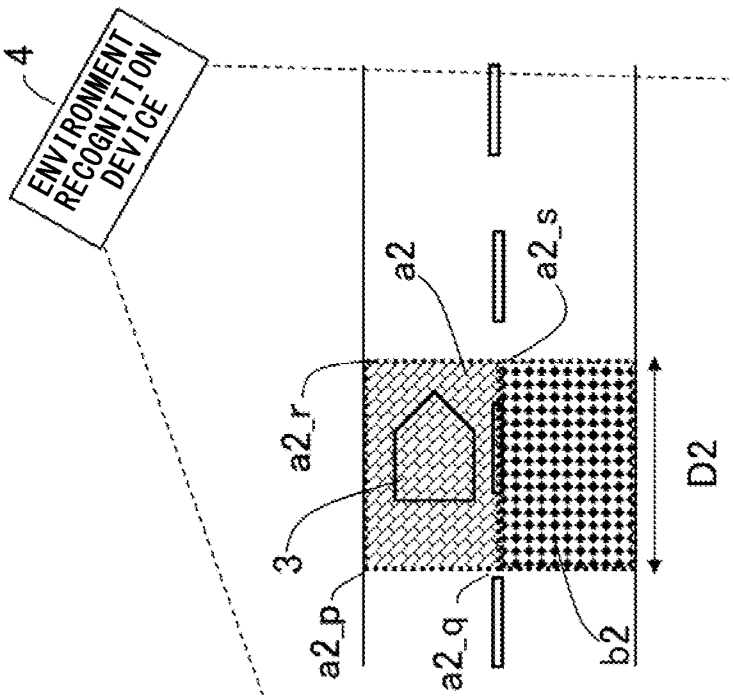
FIGS. 10A and 10B are each a diagram for explaining correction information corresponding to a reliability.
Figure 10A:
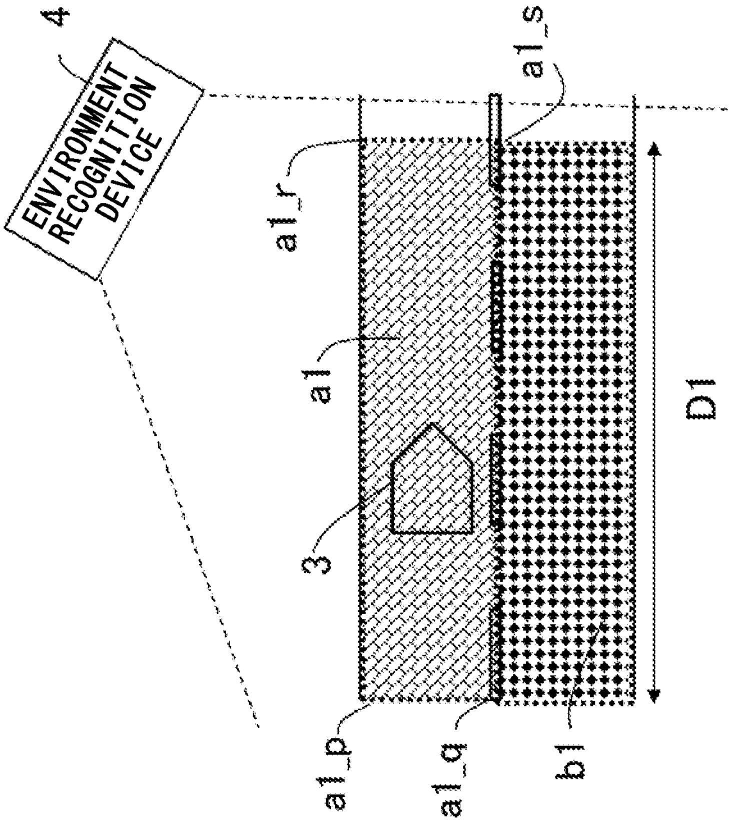

FIGS. 10A and 10B are each a diagram for explaining a method for creating correction information corresponding to a reliability. Out of FIGS. 10A and 10B, FIG. 10A shows a method for creating correction information regarding the vehicle position to be transmitted to the vehicle 3 when the value of the reliability is smaller than the first reference value. Regarding a vehicle advancement direction, a region obtained by ensuring a certain distance D1 (for example, 12 m) in the advancement direction from a position recognized by the environment recognition device 4 is divided into two areas a1 and b1 by a separator which is the center line between the lanes on the basis of the target route on which the vehicle 3 travels or the road information recognized by the environment recognition device 4. Here, if the certain distance D1 having been set is made variable according to the reliability, the granularity of the correction information can be changed according to the reliability. Thereafter, determination is performed as to which of the areas a1 and b1 is the area in which the vehicle 3 exists in the present recognition by the environment recognition device 4, and coordinates (a1_p, a1_q, a1_r, and a1_s) of the four corners of the area a1 in which the vehicle 3 exists are created as correction information.

Out of FIGS. 10A and 10B, FIG. 10B shows a method for creating correction information regarding the vehicle position to be transmitted to the vehicle 3 when the value of the reliability is smaller than the first reference value but is larger than that in FIG. 10A. In this case, division into two areas a2 and b2 is performed by employing the same method as that in the case of the above FIG. 10A. However, a certain distance D2 (for example, 6 m) in the advancement direction is shorter than the certain distance D1 in FIG. 10A. Thereafter, determination is performed as to which of the areas a2 and b2 is the area in which the vehicle 3 exists in the present recognition by the environment recognition device 4, and coordinates (a2_p, a2_q, a2_r, and a2_s) of the four corners of the area a2 in which the vehicle 3 exists are created as correction information.

Figure 11B:
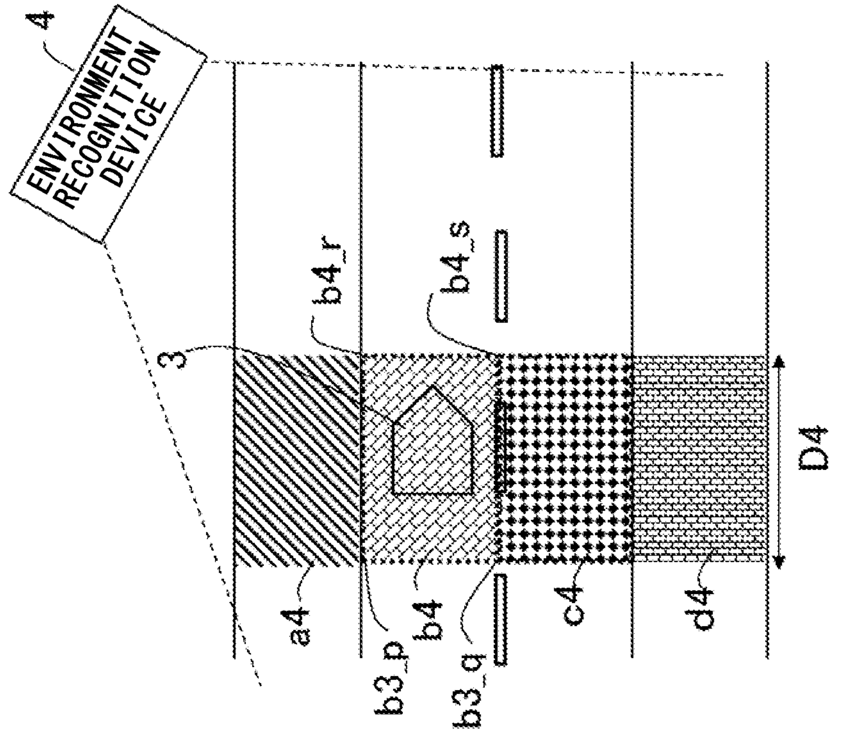
FIGS. 11A and 11B are each a diagram for explaining correction information corresponding to a reliability.
Figure 11A:
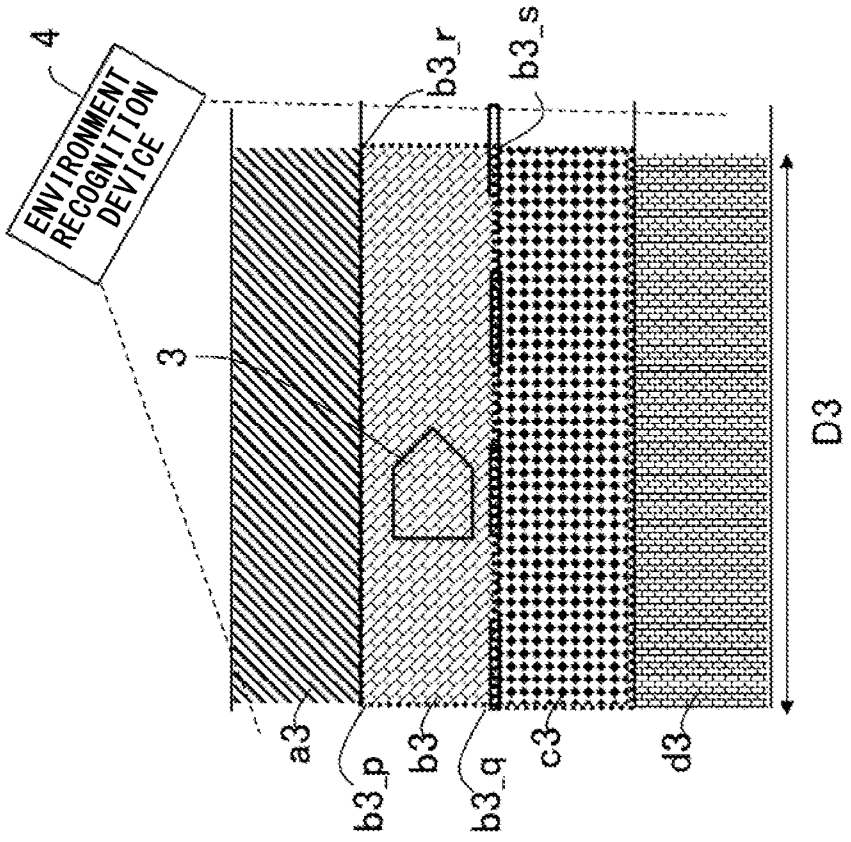

FIGS. 11A and 11B are diagrams for explaining methods for creating correction information corresponding to a reliability, the diagrams showing examples in which the number of travel lanes is larger than those in FIGS. 10A and 10B. Out of FIGS. 11A and 11B, FIG. 11A shows a method for creating correction information regarding the vehicle position to be transmitted to the vehicle 3 when the value of the reliability is smaller than the first reference value. Regarding the vehicle advancement direction, a region obtained by ensuring a certain distance D3 (for example, 12 m) in the advancement direction from a position recognized by the environment recognition device 4 is divided into two areas by a separator which is the center line between the lanes on the basis of the target route on which the vehicle 3 travels or the road information recognized by the environment recognition device 4. The two areas are further divided into areas a3, b3, c3, and d3 by increasing the number of separators according to the distinguished lanes. Here, if the certain distance D3 having been set is made variable according to the reliability, the granularity of the correction information can be changed according to the reliability. Thereafter, determination is performed as to which of the areas a3, b3, c3, and d3 is the area in which the vehicle 3 exists in the present recognition by the environment recognition device 4, and coordinates (b3_p, b3_q, b3_r, and b3_s) of the four corners of the area b3 in which the vehicle 3 exists are created as correction information.

Out of FIGS. 11A and 11B, FIG. 11B shows a method for creating correction information regarding the vehicle position to be transmitted to the vehicle 3 when the value of the reliability is smaller than the first reference value but is larger than that in FIG. 11A. In FIG. 11B as well, coordinates (b4_p, b4_q, b4_r, and b4_s) of the four corners of the area in which the vehicle 3 exists are created as correction information in the same manner. Here, the certain distance D4 is shorter than the certain distance D3.

Although the coordinates which are positional information about the vehicle 3 and which indicate the region (i.e., area) in which the vehicle 3 exists have been described as an example of the correction information, the correction information is not limited thereto. The correction information has at least the positional information about the vehicle and may include the posture of the vehicle, the speed of the vehicle, and the like in addition to the positional information.

The correction information created as described above is information for an own-vehicle position reckoning system such as the dead reckoning unit 34 mounted to the vehicle 3, and use of this correction information makes it possible to suppress accumulation of errors caused by prolonged reckoning by the dead reckoning unit 34.

A method for calculating a certain distance D in the advancement direction is as follows, for example. That is, if the reliability is defined as Rall and a coefficient is defined as K, the certain distance D can be obtained according to the following expression (4).

$$D = Rall \times K \tag{4}$$

The calculation method is not limited thereto.

As described above, in the second embodiment, the same advantageous effect as that in the first embodiment is exhibited. Specifically, the own-vehicle position and the angle can be estimated with high accuracy on the basis of the unification environment information transmitted from the position estimation device, even if the vehicle itself is not mounted with any expensive sensor such as a satellite positioning sensor.

The position estimation device according to the second embodiment further includes: a reliability calculation unit which calculates a reliability for each environment recognition device or each sensor provided thereto, and reliabilities of pieces of the control object information Y; and a reliability comparison unit which compares the calculated reliabilities with each other. The reliability comparison unit selects the unification environment information from the environment recognition device or the sensor having the highest reliability, or the vehicle information in the control object information Y having the highest reliability, and outputs the selected information as positional information about the vehicle. Consequently, the position and the angle can be estimated with an even higher accuracy.

In addition, when the value of the highest reliability is smaller than the preset first reference value, pieces of correction information including at least the positional information about the mobile object are created according to the granularity of information based on the reliability and are outputted together with the unification environment information having been selected. Consequently, the vehicle can estimate or correct the own position and the angle with reference to these pieces of correction information as well.

Third Embodiment

A position estimation device and a traffic control system according to a third embodiment will be described below with reference to the drawings. The same descriptions as those of the first and second embodiments are not repeated. The position estimation device according to the present third embodiment has, in addition to the functions in the second embodiment, a function of performing prediction as to whether the vehicle will deviate from the target route, on the basis of at least two types of information among the control object information including at least the target route and the target vehicle speed and provided from the vehicle, map information, or travel route information (travel history), about the vehicle, recorded in the position estimation device up until the present time.

<Configuration of Traffic Control System>

Figure 12:
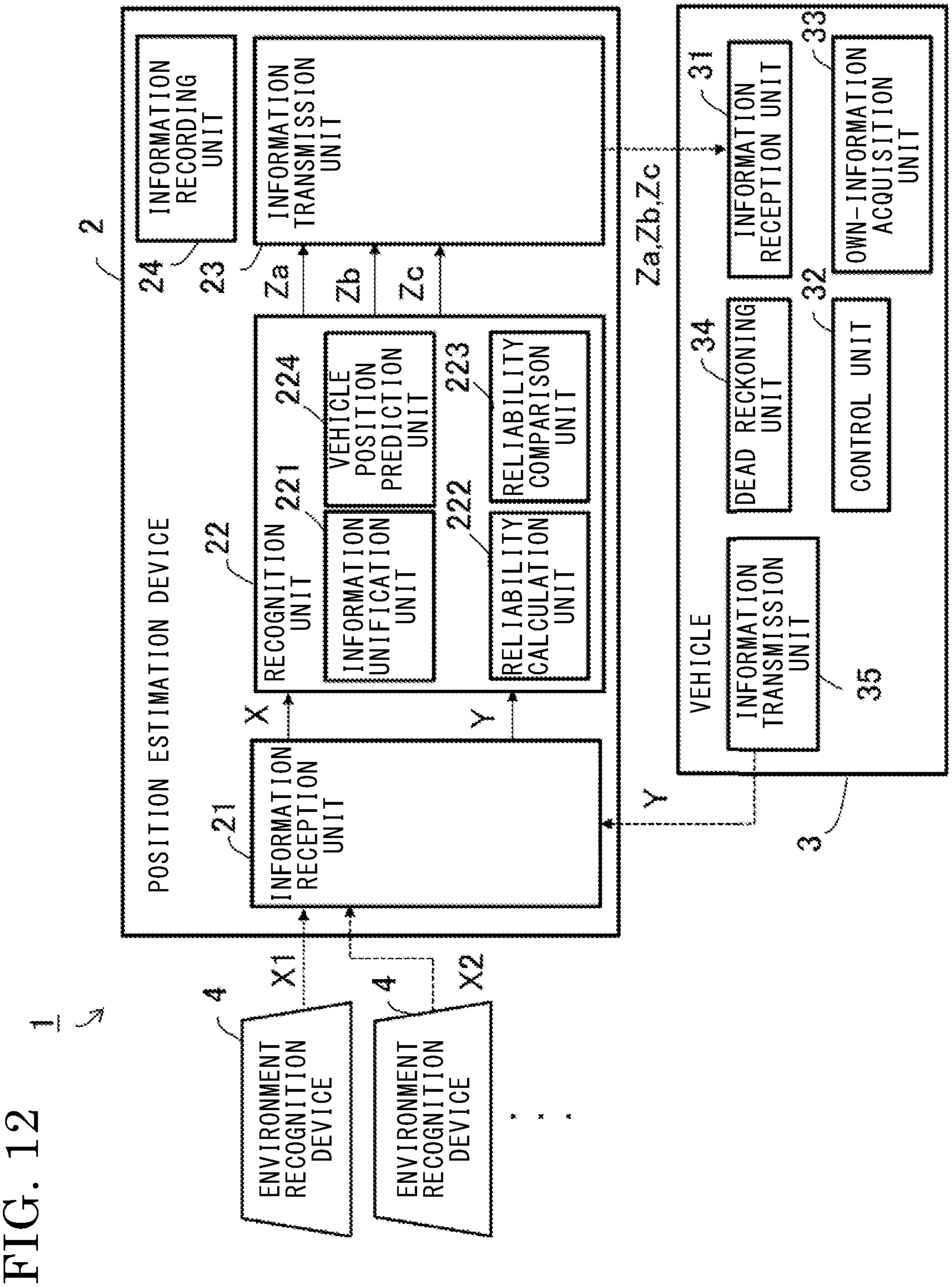
FIG. 12 is a function block diagram showing each constituent of a traffic control system according to a third embodiment.

FIG. 12 is a function block diagram of each functional unit composing the traffic control system according to the third embodiment. The configuration of the traffic control system according to the third embodiment is the same as that in FIG. 5 regarding the second embodiment. The configuration of each environment recognition device 4 is the same as those in the first and second embodiments, and the configuration of the vehicle 3 is the same as that in the second embodiment.

<Configuration of Position Estimation Device 2>

As shown in FIG. 12, the position estimation device 2 includes: the information reception unit 21 which receives information transmitted from the environment recognition device 4 and the vehicle 3; the recognition unit 22 which unifies acquired pieces of the surrounding environment information X and acquired pieces of the control object information Y through the sensor fusion technique which is a publicly-known technique; the information transmission unit 23 which transmits each piece of information to the vehicle 3; and the information recording unit 24 which records the positional information about the detected vehicle, and the like. The recognition unit 22 includes a vehicle position prediction unit 224 in addition to: the information unification unit 221 which unifies the acquired pieces of surrounding environment information X and the acquired pieces of control object information Y; the reliability calculation unit 222 which calculates a reliability for each environment recognition device 4 or each sensor, and reliabilities of the pieces of control object information Y; and the reliability comparison unit 223 which compares the calculated reliabilities with each other and creates correction information according to the result of the comparison.

The vehicle position prediction unit 224 predicts a behavior of the vehicle 3 as to whether the vehicle 3 will deviate from the target route, on the basis of at least two types of information among the control object information Y including at least the target route, the target vehicle speed, the vehicle position, and the posture and provided from the vehicle 3, the map information, or travel track information, about the vehicle, recorded in the information recording unit 24 up until the present time.

<Operation of Position Estimation Device 2>

Next, operation of the position estimation device 2 will be described with reference to the flowchart in FIG. 13. The same operations as those in FIG. 3 regarding the first embodiment and FIG. 7 regarding the second embodiment will be described in a simplified manner.

First, in step S301, the position estimation device 2 collects pieces of surrounding environment information X (surrounding information collection step) in the same manner as in step S101 in the first embodiment.

Next, in step S302, vehicle information as the control object information Y transmitted from the vehicle 3 and including at least a target route, a target vehicle speed, a vehicle's target speed, an own-vehicle position, and a posture is received (vehicle information collection step) in the same manner as in step S202 in the second embodiment.

Next, in step S303, the information unification unit 221 unifies the pieces of surrounding environment information X through a publicly-known technique (information unification step) in the same manner as in step S102 in the first embodiment. Consequently, the pieces of object information from the plurality of environment recognition devices 4 are unified, whereby information with a higher accuracy can be obtained.

Next, in step S304, a reliability for each environment recognition device 4 or each sensor, and reliabilities of pieces of the control object information Y, are calculated (reliability calculation step) in the same manner as in step S204 in the second embodiment. The reliability calculation is the same as that in the second embodiment.

Next, in step S305, the calculated reliabilities are compared with each other, determination is performed as to which environment recognition device 4 or sensor has the highest reliability or as to which control object information Y has the highest reliability, and the positional information having the highest reliability is selected as information to be transmitted to the vehicle 3 (reliability comparison step) in the same manner as in step S205 in the second embodiment.

Next, in step S306, whether or not correction information to be transmitted to the vehicle 3 is necessary is determined (correction information creation determination step) in the same manner as in step S206 in the second embodiment. Whether or not correction information is necessary is determined as follows on the basis of, for example, the result of the reliability comparison step. That is, when the value of the highest reliability is smaller than the preset first reference value (No in step S306), it is determined to create correction information, and the process advances to step S307. In step S307, correction information Zc to be transmitted to the vehicle 3 is created (correction information creation step) in the same manner as in step S207 in the second embodiment, and the process advances to step S310. The creation of the correction information Zc is the same as that in the second embodiment.

Meanwhile, when, in step S306, the value of the highest reliability is equal to or larger than the preset first reference value and it is determined that creation of correction information is unnecessary in the correction information creation determination step (Yes in step S306), the process advances to step S308.

In step S308, the vehicle position prediction unit 224 performs prediction as to whether a future position of the vehicle 3 will be inconsistent with the target route and will deviate from the target route, on the basis of at least two types of information among the vehicle information (control object information Y) including the target route and the target vehicle speed and provided from the vehicle 3, the map information, or the travel track information, about the vehicle 3, recorded in the information recording unit 24 up until the present time (vehicle position prediction step).

When it is predicted in step S308 that the future position of the vehicle 3 will be inconsistent with the target route and will deviate from the target route (Yes in step S308), correction information Zc is created (step S309). Here, the correction information Zc only has to be created in the same manner as that described in the second embodiment. Thereafter, the process advances to step S310.

Meanwhile, when it is predicted in step S308 that the future position of the vehicle 3 will be consistent with the target route and will not deviate from the target route (No in step S308), the process advances to step S310.

In step S310, the information transmission unit 23 transmits, to the vehicle 3, the pieces of information including the correction information Zc generated when it is predicted that the future position of the vehicle 3 will be inconsistent with the target route and will deviate from the target route.

Figure 13:
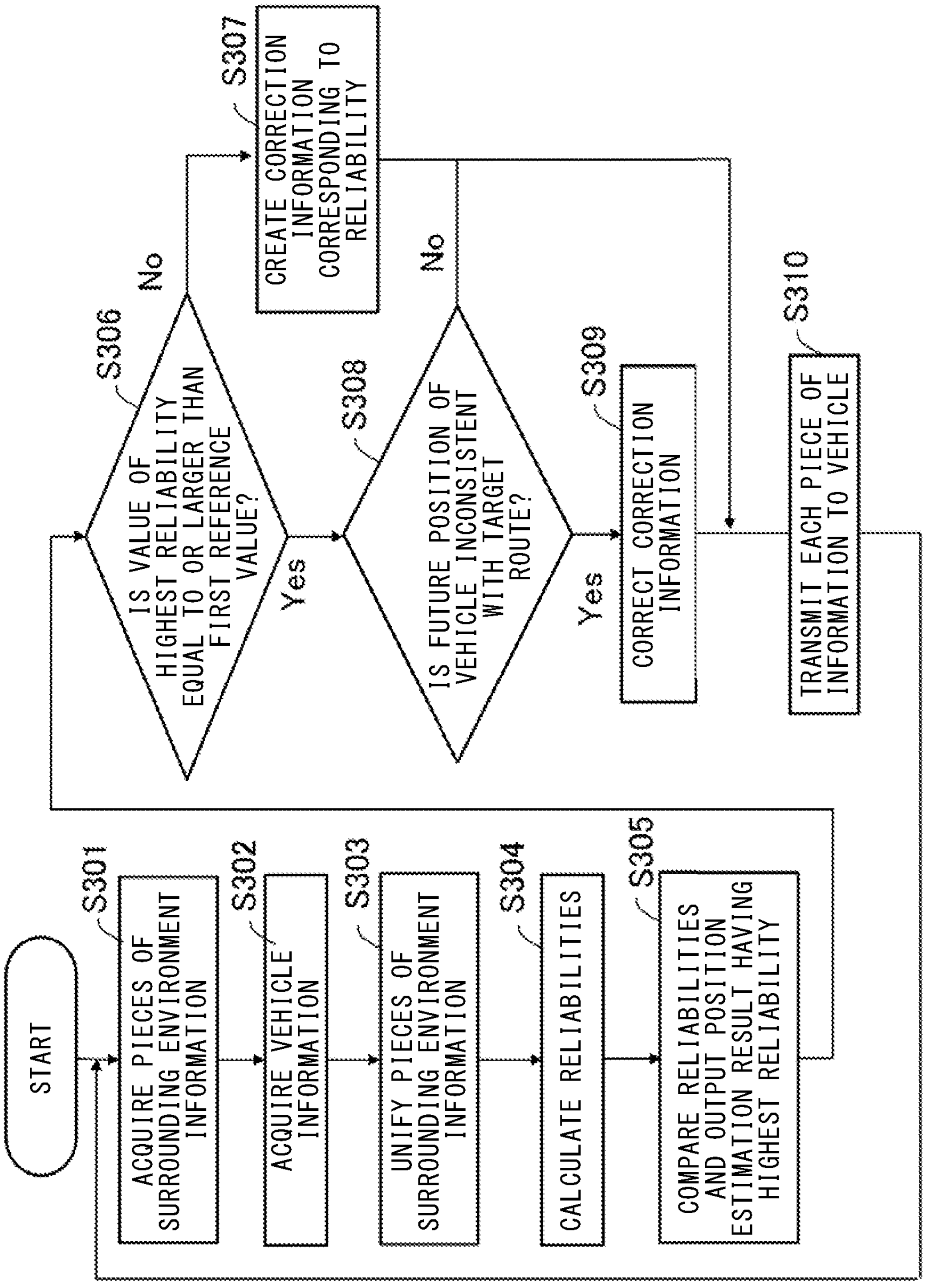
FIG. 13 is a flowchart showing operation of a position estimation device according to the third embodiment.

The position estimation device 2 repeatedly executes the flow shown in FIG. 13 in a predetermined cycle (for example, 1 second).

<Method for Predicting Future Position of Vehicle 3>

A method for predicting a future position of the vehicle 3 by the vehicle position prediction unit 224 will be described.

Figure 14:
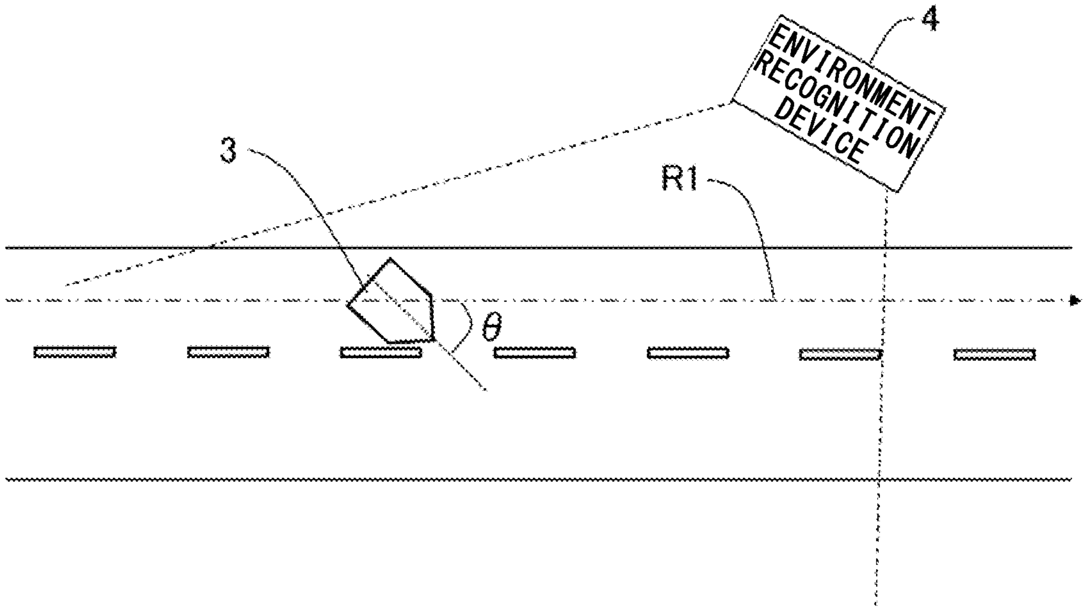
FIG. 14 is a diagram for explaining a method for predicting a future position of the vehicle.

FIG. 14 is a diagram for explaining a method for predicting a future position of the vehicle 3. In FIG. 14, the posture of the vehicle 3 does not match the direction of a target route R1, and advancement with this posture leads to deviation from the target route R1. Therefore, it is predicted that the vehicle 3 will deviate from the target route R1 in the future. Examples of the determination criterion include the condition that the angle θ of the vehicle 3 relative to the target route R1 is not smaller than 45 degrees and not larger than −45 degrees. The determination method and the determination criterion are not limited thereto.

Figure 15:
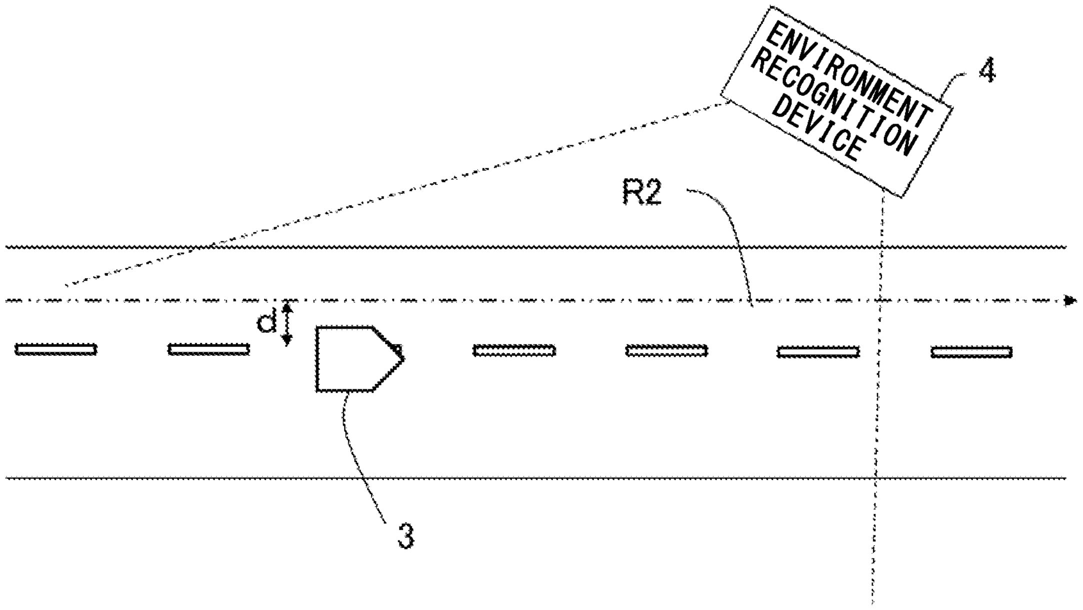
FIG. 15 is a diagram for explaining a method for predicting a future position of the vehicle.

FIG. 15 is a diagram for explaining another method for predicting a future position of the vehicle 3. FIG. 15 shows the relationship between the vehicle 3 and a travel history R2 recorded in the information recording unit 24 of the position estimation device 2. As the travel history R2, a travel history related to a scene similar to that of the present target route of the vehicle 3 is extracted from among travel histories recorded in the information recording unit 24, and the vehicle position in the scene and the present position of the vehicle 3 are compared with each other. When the difference d between the positions is larger than a preset reference value or when the angle θ of the vehicle is obviously different as in the example in FIG. 14, it is predicted that deviation will occur in the future. Examples of the determination criterion include: the condition that the angle θ of the vehicle 3 relative to the travel history R2 is not smaller than 45 degrees and not larger than −45 degrees; and the condition that the vehicle 3 is away from the travel history R2 by a distance of one vehicle.

Figure 16:
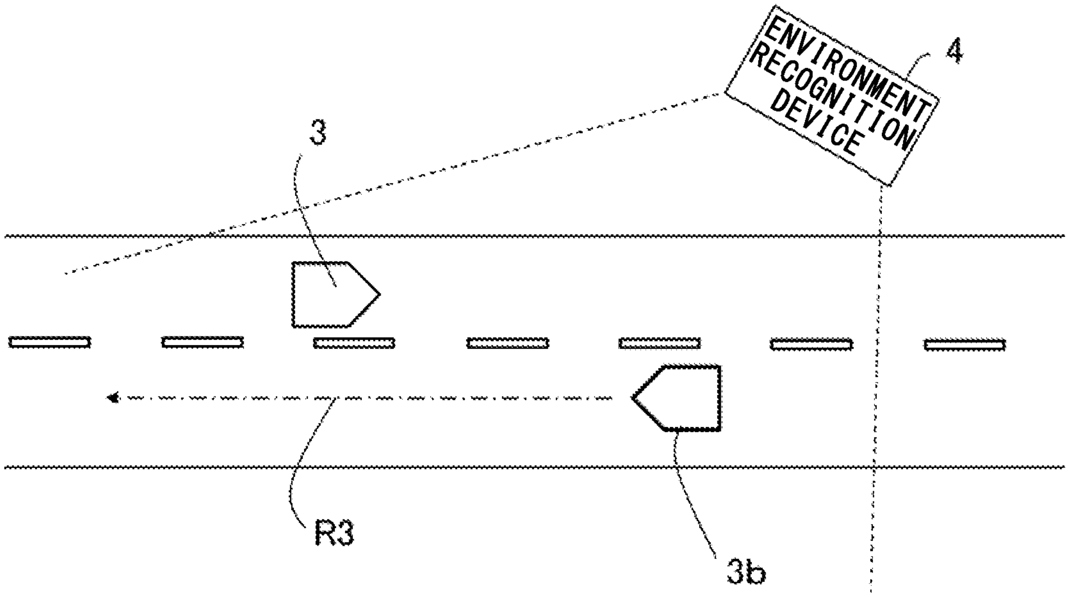
FIG. 16 is a diagram for explaining a method for predicting a future position of the vehicle.
Figure 17:
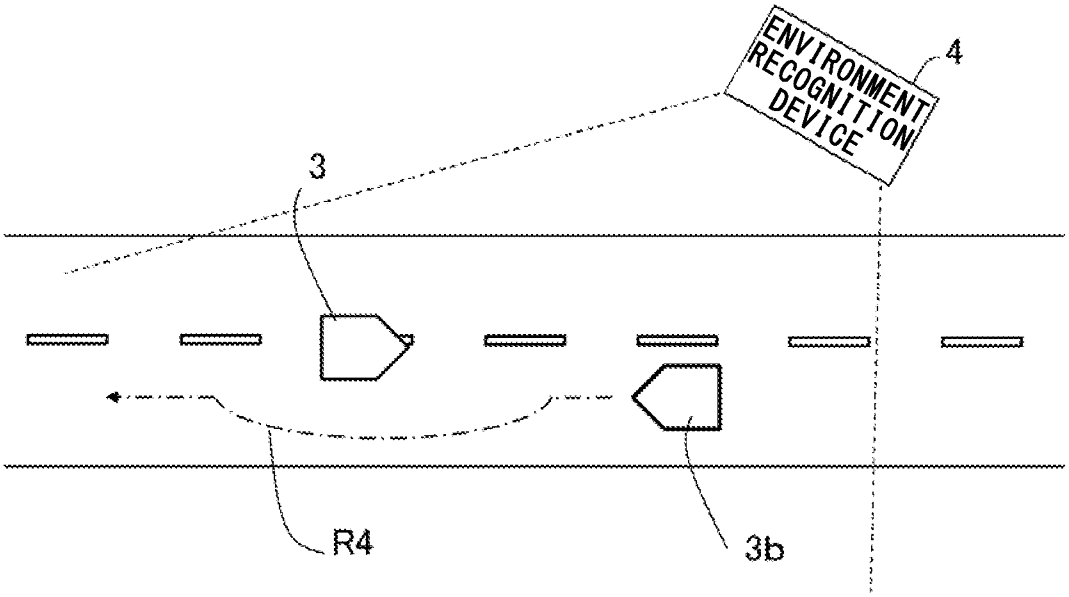
FIG. 17 is a diagram for explaining a method for predicting a future position of the vehicle.

FIG. 16 and FIG. 17 are each a diagram for explaining still another method for predicting a future position of the vehicle 3. Another vehicle 3*b* is a vehicle different from the vehicle 3 being controlled, and may be a vehicle being controlled by the traffic control system according to the third embodiment or does not have to be such a vehicle.

In FIG. 16, the vehicle 3 is traveling on the center of a lane, and thus the other vehicle 3*b* is also traveling on the center of a lane along a travel route R3. However, in FIG. 17, the vehicle 3 is traveling on the center line between the lanes, and thus the other vehicle 3*b* is traveling along a travel route R4 which is shifted to the left side of the lane. This situation is detected by the position estimation device 2, and, when the other vehicle 3*b* is not traveling on the center of the lane in a state where no obstacle exists in front of the other vehicle 3*b*, it is predicted that the vehicle 3 is traveling, or might travel, in a state of deviating from the target route.

The correction information Zc created when it is predicted that the future position of the vehicle 3 will be inconsistent with the target route and will deviate from the target route, includes at least the positional information about the vehicle and desirably includes the angle (posture) and the speed of the vehicle that are used for determining whether or not the vehicle will deviate from the target route.

As described above, in the third embodiment, the same advantageous effect as that in the first embodiment is exhibited. Specifically, the own-vehicle position and the angle can be estimated with high accuracy on the basis of the unification environment information transmitted from the position estimation device, even if the vehicle itself is not mounted with any expensive sensor such as a satellite positioning sensor.

The position estimation device according to the third embodiment receives, from the mobile object, second control object information as second mobile object information including at least a target route, a target vehicle speed, a position, and a posture, and the recognition unit further includes a vehicle position prediction unit which predicts a future position of the mobile object. When the reliability comparison unit determines that the value of the highest reliability is equal to or larger than the preset first reference value, the vehicle position prediction unit performs prediction as to whether or not the future position of the mobile object and the target route will be consistent with each other, on the basis of at least two types of information among the second mobile object information, the map information, and information among travel route histories recorded in the information recording unit, and, when predicting that there will be no consistency therebetween, creates correction information including at least the positional information about and the angle of the mobile object, and the correction information is transmitted to the vehicle. Consequently, information for allowing the vehicle to travel on the target route can be provided, and the vehicle can stably travel.

Fourth Embodiment

A position estimation device and a traffic control system according to a fourth embodiment will be described below with reference to the drawings. The same descriptions as those of the first to third embodiments are not repeated.

<Configuration of Traffic Control System>

Figure 18:
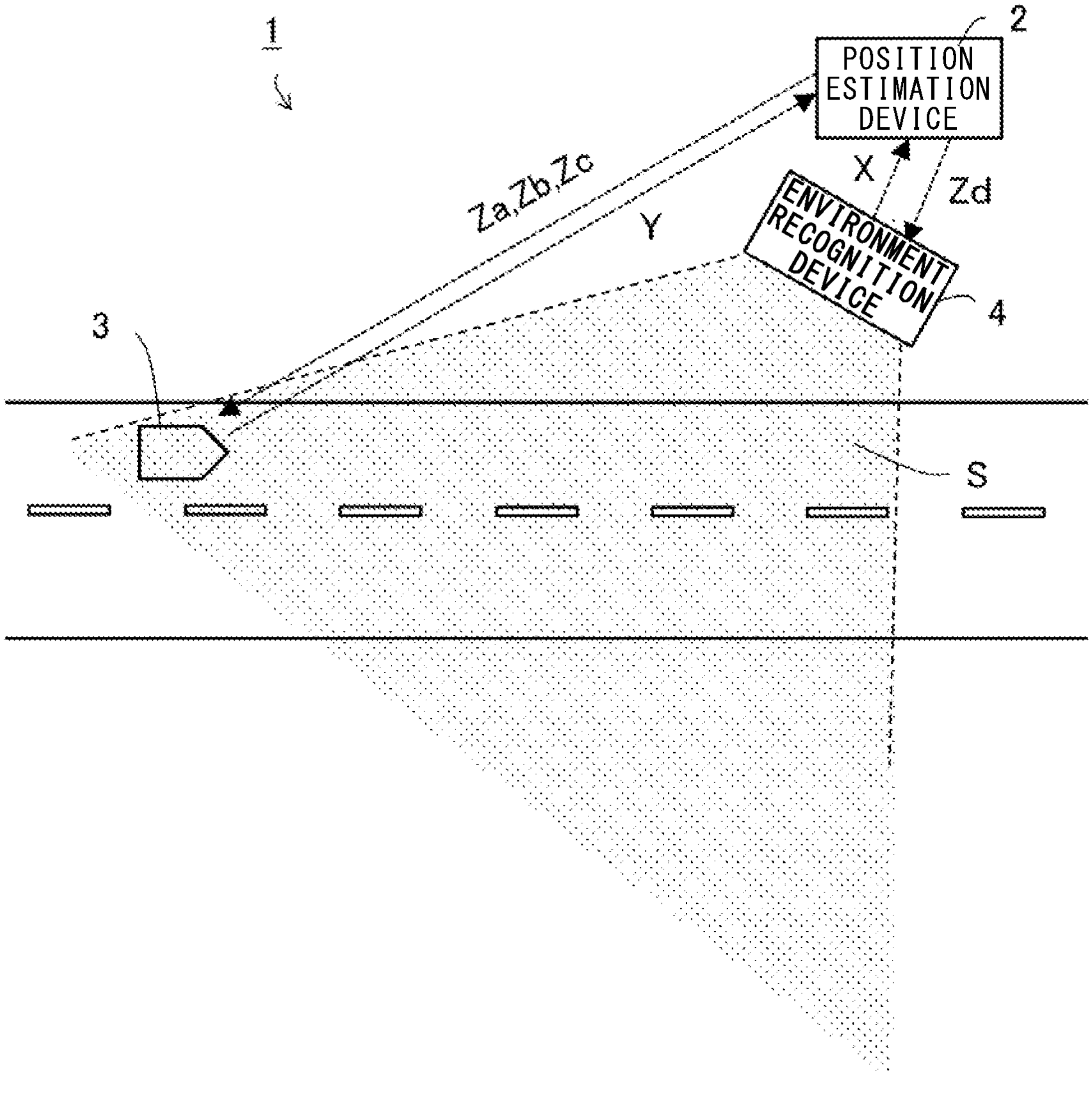
FIG. 18 shows a configuration of a traffic control system according to a fourth embodiment.
Figure 19:
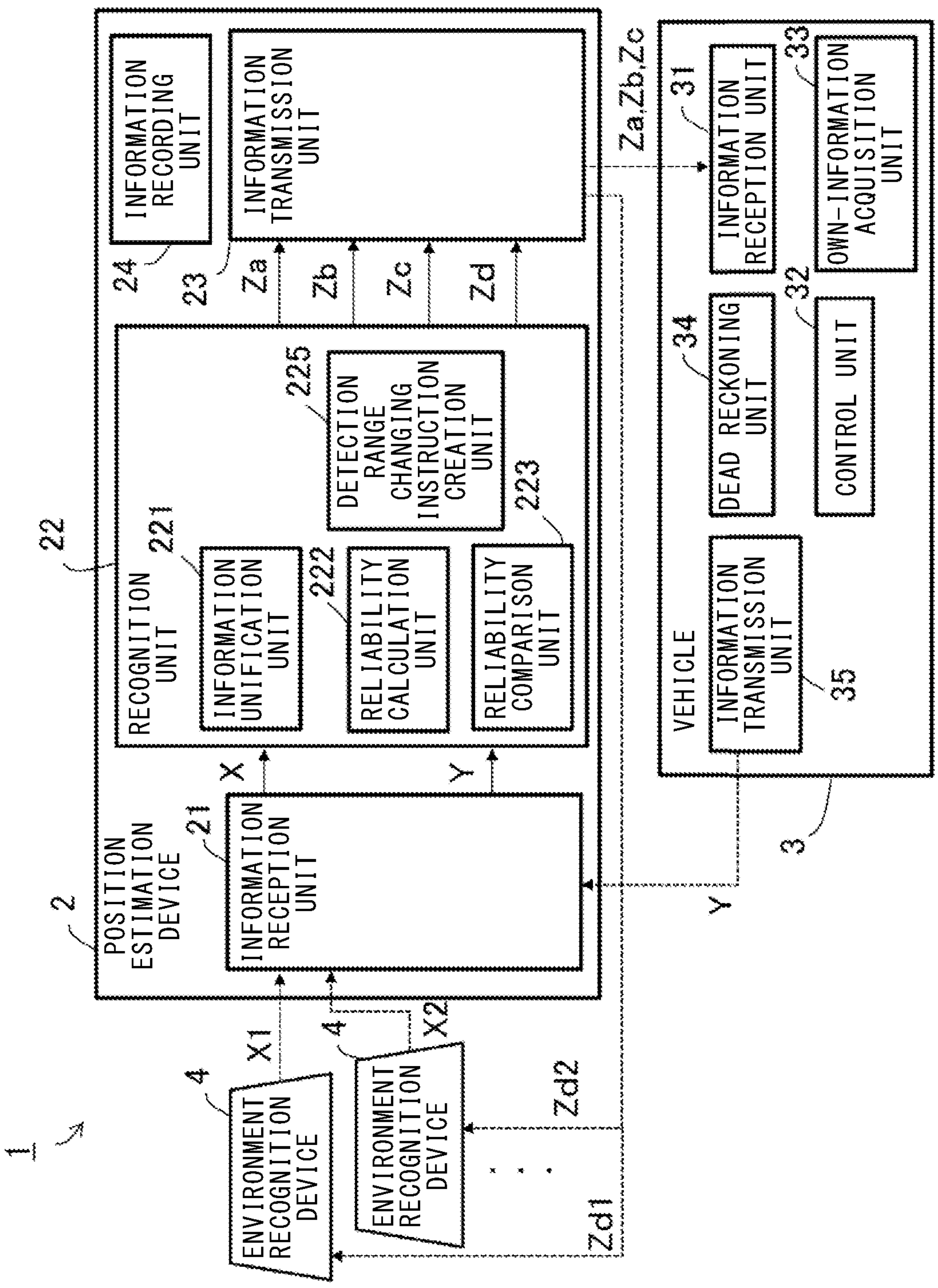
FIG. 19 is a function block diagram showing each constituent of the traffic control system according to the fourth embodiment.

FIG. 18 shows a configuration of the traffic control system according to the fourth embodiment, and FIG. 19 is a function block diagram of each functional unit composing the traffic control system. The configuration of each environment recognition device 4 is the same as those in the first to third embodiments, and the configuration of the vehicle 3 is the same as those in the second and third embodiments. The position estimation device 2 according to the present fourth embodiment has, in addition to the functions in the second embodiment, a function of adjusting the detection range of each of the sensors of the environment recognition devices 4 according to the reliability created by the position estimation device 2. Therefore, each of the sensors of the environment recognition devices 4 receives detection range changing information Zd from the position estimation device 2 and performs object recognition within a detection range corresponding to this information.

<Configuration of Position Estimation Device 2>

As shown in FIG. 19, the position estimation device 2 includes: the information reception unit 21 which receives information transmitted from the environment recognition device 4 and the vehicle 3; the recognition unit 22 which unifies acquired pieces of the surrounding environment information X and acquired pieces of the control object information Y through the sensor fusion technique which is a publicly-known technique; the information transmission unit 23 which transmits each piece of information to the vehicle 3; and the information recording unit 24 which records the positional information about the detected vehicle, and the like. The recognition unit 22 includes a detection range changing instruction creation unit 225 in addition to: the information unification unit 221 which unifies the acquired pieces of surrounding environment information X; the reliability calculation unit 222 which calculates a reliability for each environment recognition device 4 or each sensor, and reliabilities of the pieces of control object information Y; and the reliability comparison unit 223 which compares the calculated reliabilities with each other and creates correction information according to the result of the comparison.

The detection range changing instruction creation unit 225 determines, on the basis of the reliabilities created by the reliability calculation unit 222 and the result of comparison therebetween created by the reliability comparison unit 223, whether or not the detection range of each sensor is appropriate. In the case of determining that the detection range is not appropriate, the detection range changing instruction creation unit 225 generates an instruction to change the detection range of said sensor. Examples of a method involving determination as to whether or not the detection range of the sensor is appropriate include a method in which, when the vehicle is located at a position far away from the sensor and the resolution in the detection is lower than a preset resolution, the detection range of the sensor is narrowed so as to make the appearance of the vehicle clearly viewable. However, the method is not limited thereto.

<Operation of Position Estimation Device 2>

Next, operation of the position estimation device 2 will be described with reference to the flowchart in FIG. 20. The same operations as those in the first to third embodiments will be described in a simplified manner.

First, in step S401, the position estimation device 2 collects pieces of surrounding environment information X (surrounding information collection step) in the same manner as in step S101 in the first embodiment.

Next, in step S402, vehicle information as the control object information Y transmitted from the vehicle 3 and including at least a target route, a target vehicle speed, a vehicle's target speed, an own-vehicle position, and a posture is received (vehicle information collection step) in the same manner as in step S202 in the second embodiment.

Next, in step S403, the information unification unit 221 unifies the pieces of surrounding environment information X through a publicly-known technique (information unification step) in the same manner as in step S102 in the first embodiment.

Next, in step S404, a reliability for each environment recognition device 4 or each sensor, and reliabilities of pieces of the control object information Y, are calculated (reliability calculation step) in the same manner as in step S204 in the second embodiment. The reliability calculation is the same as that in the second embodiment.

Next, in step S405, whether or not the value of the highest reliability among the calculated reliabilities is smaller than a preset second reference value is determined (reliability checking step). When the value of the reliability is equal to or larger than the preset second reference value (No in step S405), the process advances to step S406. In step S406, correction information Zc to be transmitted to the vehicle 3 is created (correction information creation step). The creation of the correction information Zc is the same as that in the second embodiment. Here, the second reference value is set to a value equal to or smaller than the first reference value described in the second embodiment.

Meanwhile, when it is determined in step S405 that the value of the highest reliability is smaller than the preset second reference value (Yes in step S405), the process advances to step S407.

In step S407, the detection range changing instruction creation unit 225 creates an instruction to change the detection range of the sensor corresponding to the reliability that has been determined to have a value smaller than the second reference value (detection range changing instruction creation step). The created instruction is transmitted as the detection range changing information Zd to the corresponding environment recognition device 4.

Figure 20:
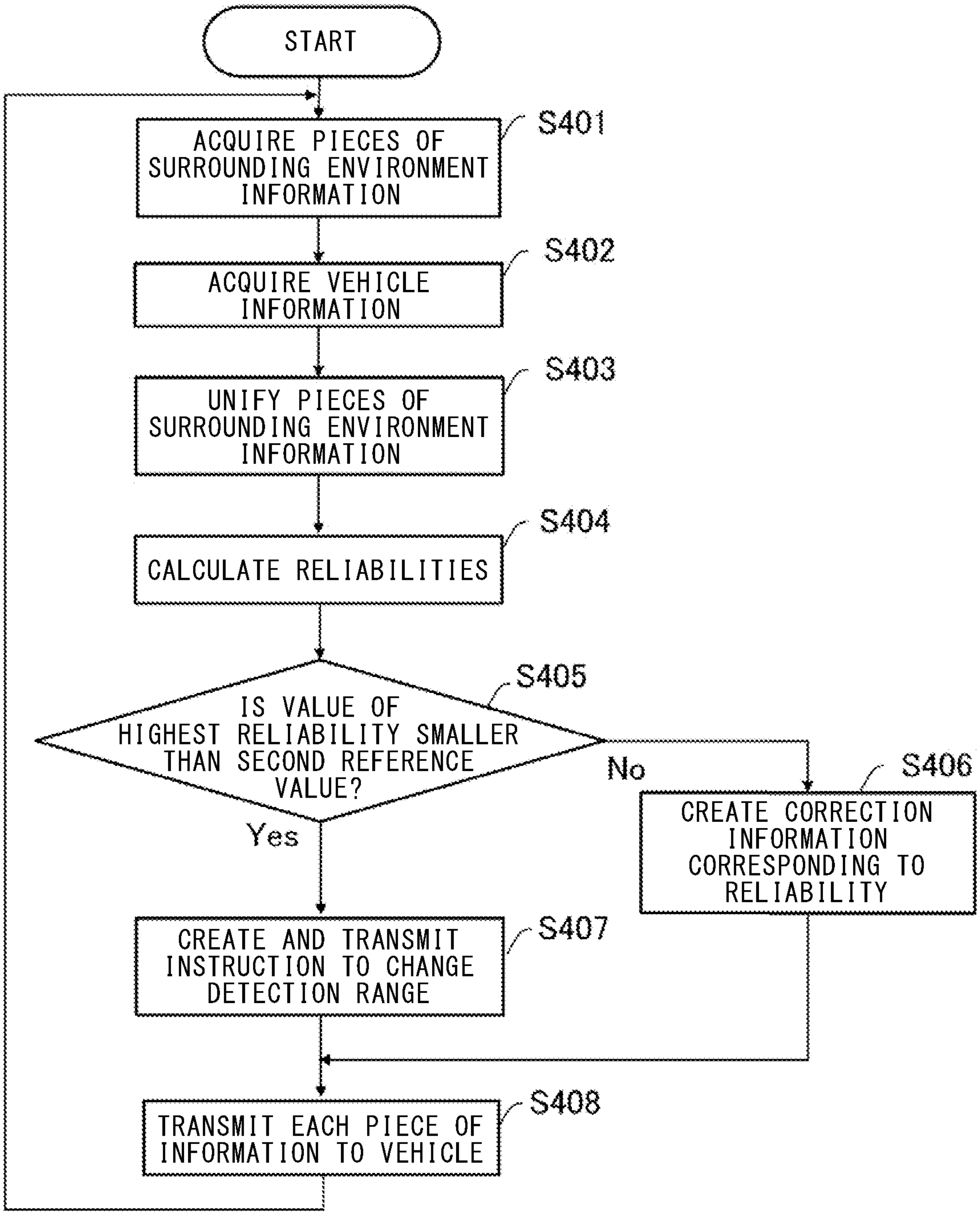
FIG. 20 is a flowchart showing operation of a position estimation device according to the fourth embodiment.

The position estimation device 2 repeatedly executes the flow shown in FIG. 20 in a predetermined cycle (for example, 1 second).

<Example of Creation of Instruction to Change Detection Range>

Figure 21A:
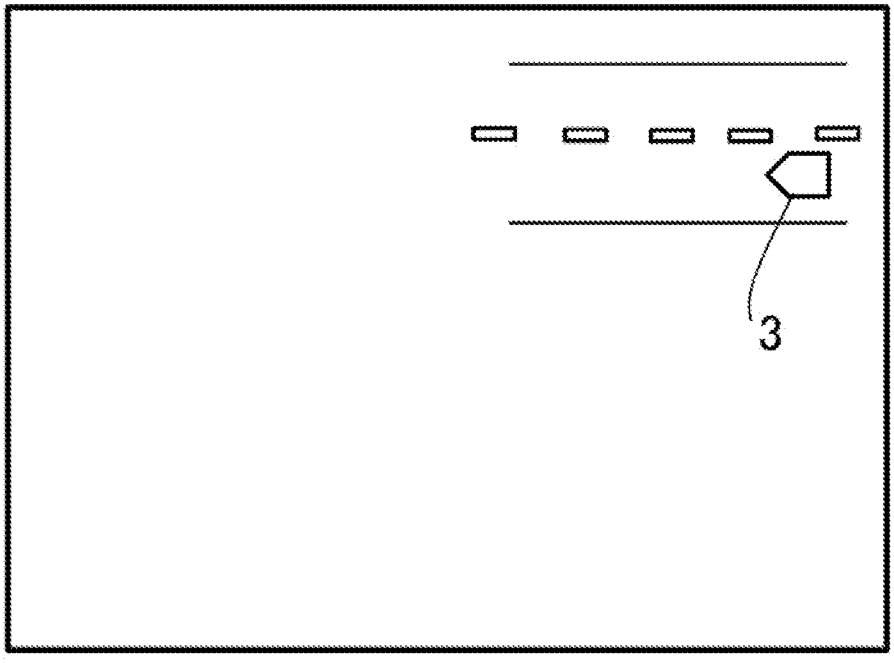
FIG. 21A is a diagram for explaining a method for generating an instruction to change the detection range of the environment recognition device, the diagram showing a pre-adjustment state.
Figure 21B:
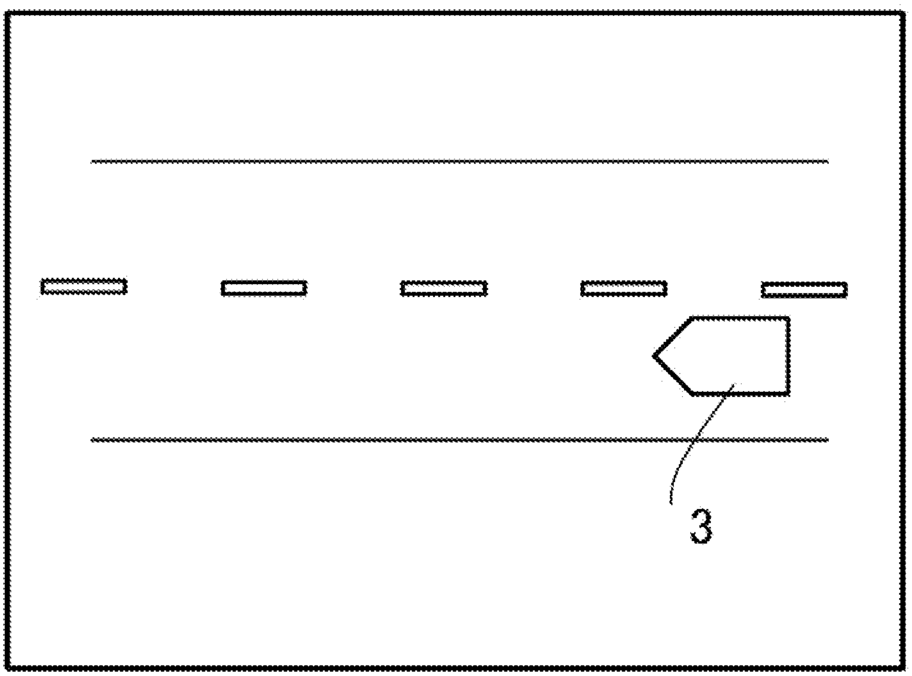
FIG. 21B is a diagram for explaining said method, the diagram showing a post-adjustment state.

Next, a method for generating an instruction to adjust the detection range of the sensor will be described. FIG. 21A is a diagram for explaining a method for generating an instruction to change the detection range of the sensor provided to each environment recognition device 4, the diagram showing a pre-changing state. FIG. 21B is a diagram for explaining said method, the diagram showing a post-changing state. In FIG. 21A, the distance between the vehicle 3 and the environment recognition device 4 is long, and the vehicle 3 looks small from the environment recognition device 4. In this case, if the detection range is changed such that the upper right side of the screen in the drawing is enlarged, the vehicle 3 can be captured so as to look large, and this can lead to improvement in the reliability. FIG. 21B shows a state taken after the detection range is changed. It is found that the reliability is improved by thus creating an instruction to change the detection range and changing the detection range.

Although FIGS. 21A and 21B show an example in which the sensor is a camera and the detection range for acquiring an image is changed, no limitation to this example is made. For example, in a case where the sensor is a LiDAR, the direction or the angle of radiation of laser light therefrom is changed. Meanwhile, in a case where the sensor is a millimeter-wave radar, the direction or the angle of radiation from the radar is changed. By any of these and other means, the detection range is changed, whereby the reliability can be improved.

As described above, in the fourth embodiment, the same advantageous effect as that in the first embodiment is exhibited. Specifically, the own-vehicle position and the angle can be estimated with high accuracy on the basis of the unification environment information transmitted from the position estimation device, even if the vehicle itself is not mounted with any expensive sensor such as a satellite positioning sensor.

In addition, the position estimation device according to the fourth embodiment further includes: a reliability calculation unit which calculates a reliability for each environment recognition device or each sensor provided thereto, and reliabilities of pieces of the control object information Y; a reliability comparison unit which compares the calculated reliabilities with each other; and a detection range changing instruction creation unit which creates an instruction to change a detection range of the environment recognition device or the sensor. When it is determined that the value of a calculated reliability is smaller than the second reference value, the detection range changing instruction creation unit creates the instruction to change the detection range of the environment recognition device or the sensor related to the reliability. Consequently, the detection range can be made appropriate, and the reliability can be improved, whereby highly-accurate position estimation can be performed.

Further, if the recognition unit 22 of the position estimation device 2 includes the vehicle position prediction unit 224 which predicts a future position of the vehicle 3 as shown in the third embodiment, the improvement in the reliability leads to further improvement also in the accuracy of predicting a future position of the vehicle.

Fifth Embodiment

A position estimation device and a traffic control system according to a fifth embodiment will be described below with reference to the drawings. The same descriptions as those of the first to third embodiments are not repeated. The position estimation device according to the present fifth embodiment has, in addition to the functions in the third embodiment, a function of creating a reliability checking operation instruction for the vehicle when a reliability created by the reliability comparison unit is low.

<Configuration of Traffic Control System>

Figure 22:
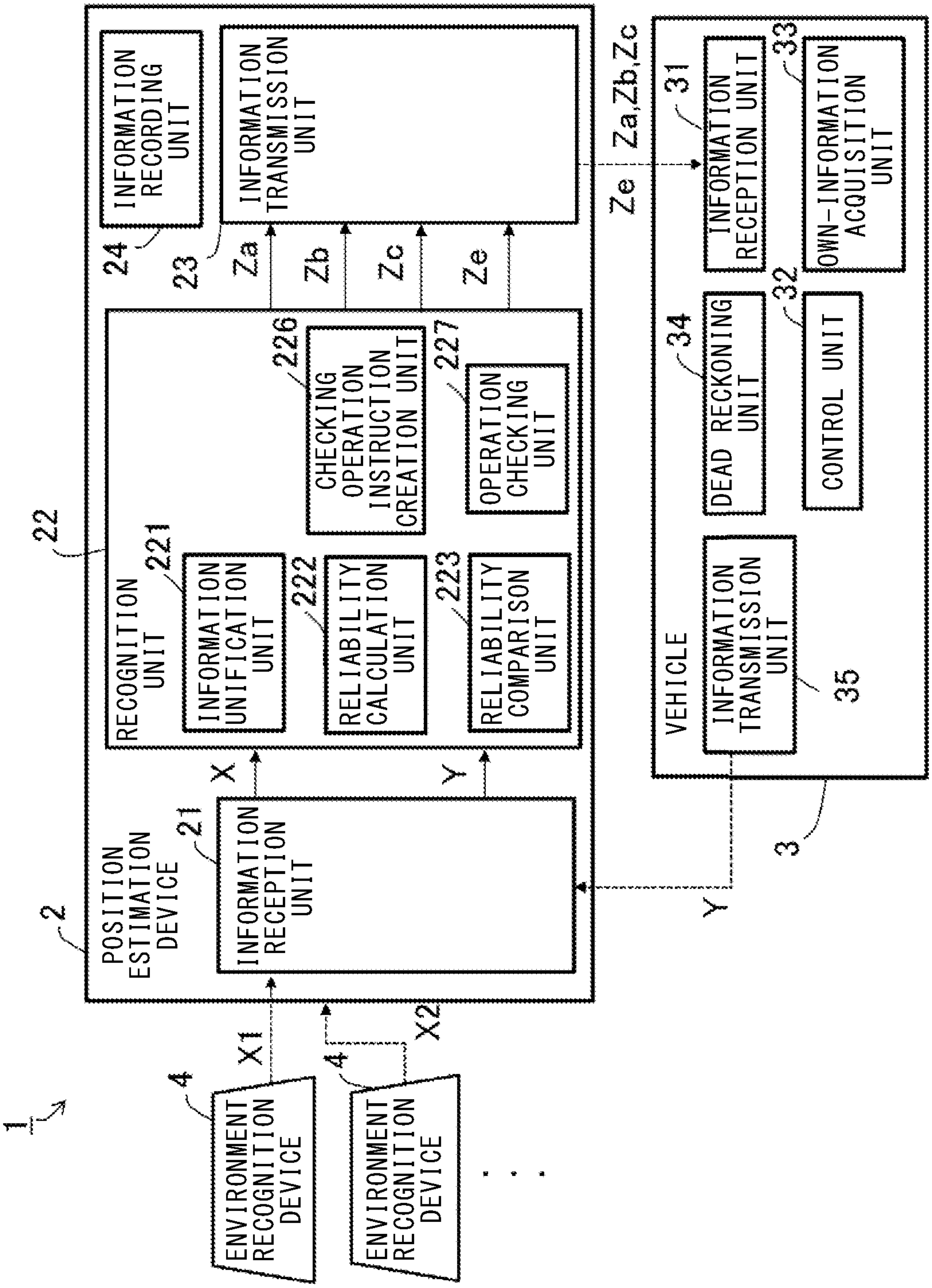
FIG. 22 is a function block diagram showing each constituent of a traffic control system according to a fifth embodiment.

FIG. 22 is a function block diagram of each functional unit composing the traffic control system according to the fifth embodiment. The configuration of the traffic control system according to the fifth embodiment is the same as that in FIG. 5 regarding the second embodiment. Also, the configuration of each environment recognition device 4 is the same as those in the first to third embodiments, and the configuration of the vehicle 3 is the same as those in the second and third embodiments.

<Configuration of Position Estimation Device 2>

As shown in FIG. 22, the position estimation device 2 includes: the information reception unit 21 which receives information transmitted from the environment recognition device 4 and the vehicle 3; the recognition unit 22 which unifies acquired pieces of the surrounding environment information X and acquired pieces of the control object information Y through the sensor fusion technique which is a publicly-known technique; the information transmission unit 23 which transmits each piece of information to the vehicle 3; and the information recording unit 24 which records the positional information about the detected vehicle, and the like. The recognition unit 22 includes a checking operation instruction creation unit 226 and an operation checking unit 227 in addition to: the information unification unit 221 which unifies the acquired pieces of surrounding environment information X and the acquired pieces of control object information Y; the reliability calculation unit 222 which calculates a reliability for each environment recognition device 4 or each sensor; and the reliability comparison unit 223 which compares the calculated reliabilities with each other and creates correction information according to the result of the comparison.

On the basis of the reliabilities created by the reliability calculation unit 222 and the result of comparison therebetween created by the reliability comparison unit 223, when the value of the highest reliability is smaller than a third reference value, the checking operation instruction creation unit 226 selects an operation that the vehicle 3 is caused to perform in order to check the reliability of the sensor of the relevant environment recognition device 4, and creates a checking operation instruction Ze. The operation checking unit 227 checks whether an expected result has been obtained through execution, by the vehicle, of the operation specified in the checking operation instruction Ze created by the checking operation instruction creation unit 226. A method for creating the checking operation instruction Ze and a checking method for the operation will be described later. Here, the third reference value is set to a value equal to or smaller than the second reference value described in the third embodiment.

<Operation of Position Estimation Device 2>

Next, operation of the position estimation device 2 will be described with reference to the flowchart in FIG. 23.

The same operations as those in the first to third embodiments will be described in a simplified manner.

First, in step S501, the position estimation device 2 collects pieces of surrounding environment information X (surrounding information collection step) in the same manner as in step S101 in the first embodiment.

Next, in step S502, vehicle information as the control object information Y transmitted from the vehicle 3 and including at least a target route, a target vehicle speed, a vehicle's target speed, an own-vehicle position, and a posture is received (vehicle information collection step) in the same manner as in step S202 in the second embodiment.

Next, in step S503, the information unification unit 221 unifies the pieces of surrounding environment information X through a publicly-known technique (information unification step) in the same manner as in step S102 in the first embodiment.

Next, in step S504, a reliability for each environment recognition device 4 or each sensor, and reliabilities of pieces of the control object information Y, are calculated (reliability calculation step) in the same manner as in step S204 in the second embodiment. The reliability calculation is the same as that in the second embodiment.

Next, in step S505, whether or not the value of the highest reliability among the calculated reliabilities is smaller than the preset third reference value is determined (reliability checking step). When the value of the reliability is equal to or larger than the preset third reference value (No in step S505), the process advances to step S506. In step S506, correction information Zc to be transmitted to the vehicle 3 is created (correction information creation step). The creation of the correction information Zc is the same as that in the second embodiment.

Meanwhile, when it is determined in step S505 that the value of the highest reliability is smaller than the preset third reference value (Yes in step S505), the process advances to step S507.

In step S507, whether or not a checking operation instruction Ze to check the reliability has been created within several cycles is checked (operation instruction checking step). When no checking operation instruction Ze has been created within the several cycles (No in step S507), the process advances to step S508 in which, on the basis of the position at which the vehicle exists and a vehicle state detectable from the relevant environment recognition device 4, a checking operation is determined and an instruction is created (operation instruction determination and instruction creation step).

Meanwhile, when, in step S507, an operation instruction for checking the reliability has already been created within the several cycles (Yes in step S507), the process advances to step S509 in which whether or not the operation specified in the instruction has been executed as expected, or whether or not it has been confirmed that a landmark that is on the ground but has not been visible owing to a vehicle and that would otherwise be easily detectable has become detectable through execution, by the vehicle, of the operation specified in the instruction, is determined (instruction operation execution checking step).

When execution of the operation specified in the instruction has not been confirmed in step S509 (No in step S509), the process advances to step S511 in which correction information corresponding to the reliability is created or corrected.

Meanwhile, when execution of the operation specified in the instruction has been confirmed in step S509 (Yes in step S509), the process advances to step S510 in which a reliability is re-calculated (reliability re-calculation step). The reliability re-calculation may be performed through the method employed in the present time of calculation or through a different calculation method.

After the reliability is re-calculated in step S510, the process advances to step S511 in which correction information corresponding to the reliability is created or corrected.

Figure 23:
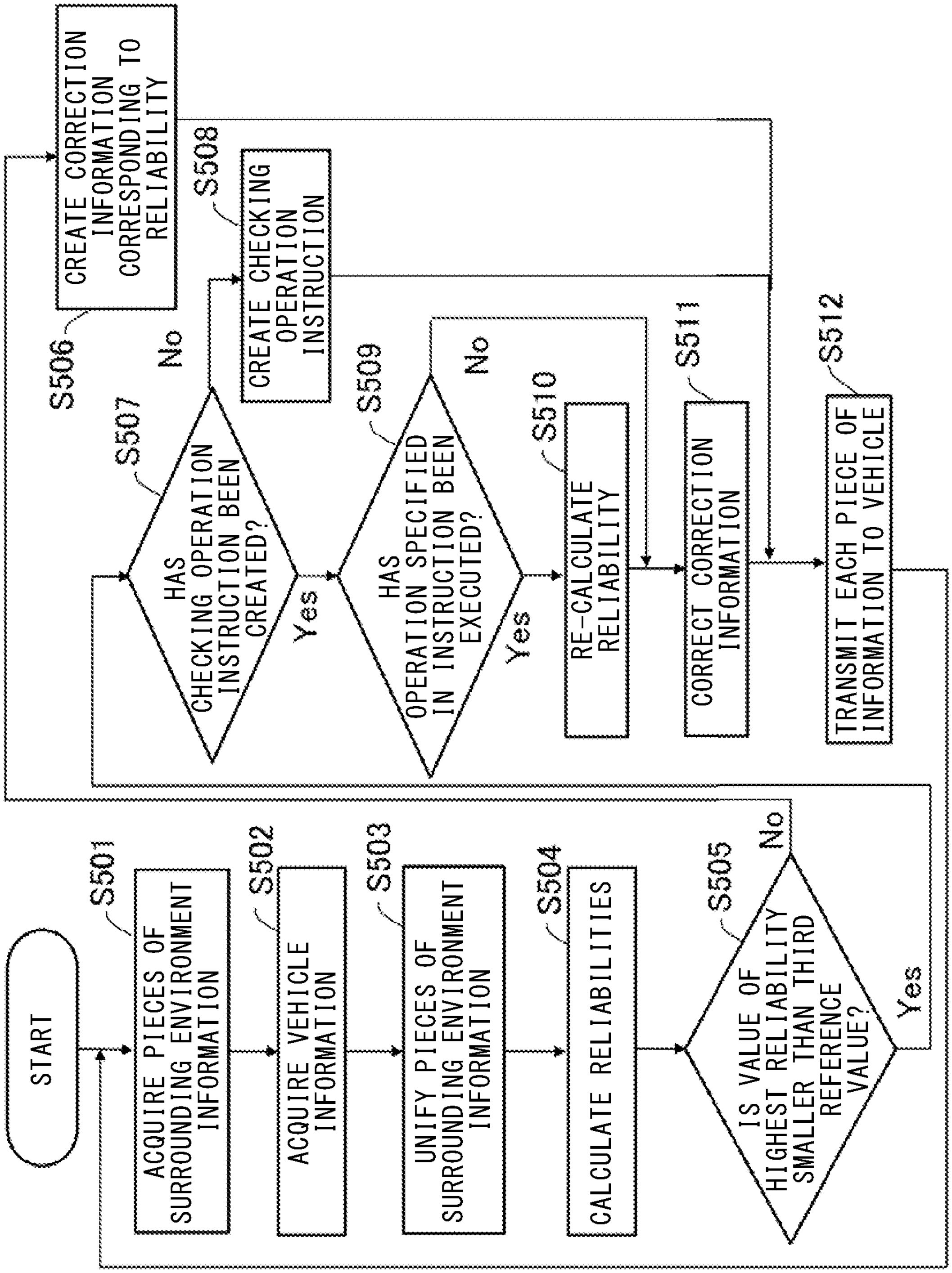
FIG. 23 is a flowchart showing operation of a position estimation device according to the fifth embodiment.

The position estimation device 2 repeatedly executes the flow shown in FIG. 23 in a predetermined cycle (for example, 1 second).

<Method for Creating Operation Instruction for Checking Reliability>

Figure 24B:
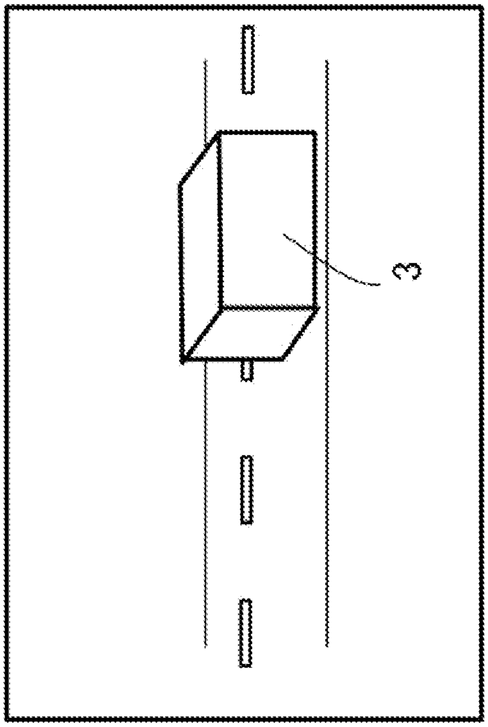
FIG. 24B is a diagram for explaining said method, the diagram showing a state as seen from a lateral side relative to the vehicle.
Figure 24A:
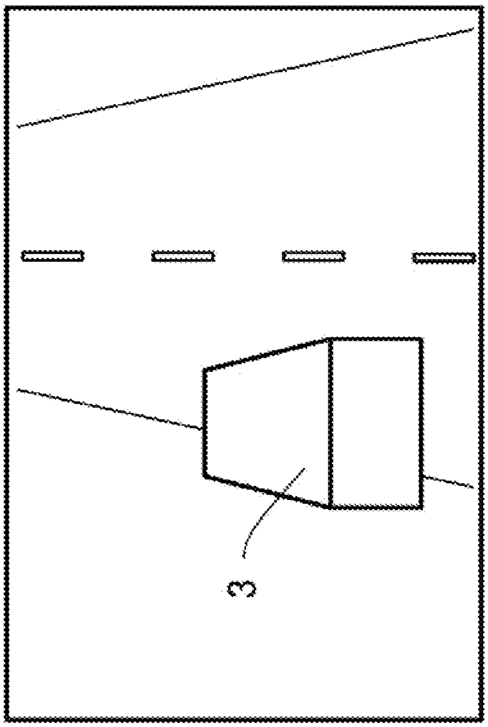
FIG. 24A is a diagram for explaining a method for generating an operation instruction for checking the reliability, the diagram showing a state as seen from behind the vehicle.
Figure 24C:
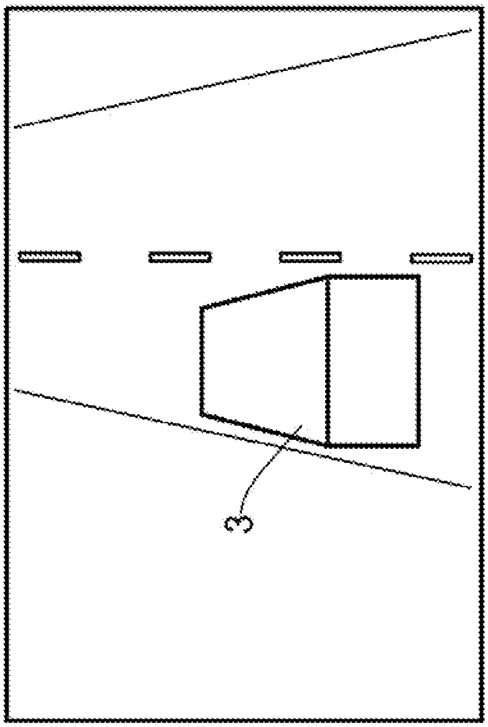
FIG. 24C is a diagram for explaining said method, the diagram showing a post-checking-operation state in FIG. 24A.

Next, a method for creating an operation instruction for checking the reliability will be described. FIG. 24A is a diagram for explaining a method for generating an operation instruction for checking the reliability, the diagram showing a state as seen from behind the vehicle. FIG. 24B is a diagram for explaining said method, the diagram showing a state as seen from a lateral side relative to the vehicle. FIG. 24C is a diagram for explaining said method, the diagram showing a post-checking-operation state in FIG. 24A. In FIG. 24A, an area behind the vehicle is visible from the environment recognition device 4. However, a white line on the road cannot be detected because of being made not visible owing to the vehicle 3 from the environment recognition device 4. Examples of the reliability checking operation that the vehicle 3 is instructed to execute in this case include an operation of traveling at a low speed with the steering wheel being turned to the right.

In FIG. 24B, a side surface of the vehicle 3 is visible from the environment recognition device 4, but a part of the lanes (center line) on the road cannot be detected because of being made not visible owing to the vehicle 3. Examples of the reliability checking operation that the vehicle 3 is instructed to execute in this case include an operation of traveling at a low speed with the steering wheel being turned to the left.

In FIG. 24C, the white line on the road can be detected unlike in FIG. 24A, and thus it can be confirmed that the operation of traveling at a low speed with the steering wheel being turned to the right has been executed in the state in FIG. 24A according to the instruction.

As described above, examples of the checking operation include an operation of oblique forward movement of the vehicle and an operation of forward or rearward movement thereof at the present place. However, the checking operation is not limited thereto.

The reliability checking operation is an operation for improving the reliability. Here, checking as to whether the operation specified in the instruction has been executed is equivalent to checking as to whether the reliability has been improved. However, the result of the checking as to whether improvement has been achieved varies according to the magnitude of the advantageous effect or depending on presence/absence of a delay, and thus said checking is written herein as checking as to whether the operation specified in the instruction has been executed. In addition, enabling of detection of a white line or a center line on the road that are presented above as examples leads to improvement of the reliability and makes it possible to perform position estimation while clarifying a fixed point. Thus, the enabling contributes to improvement of the accuracy of position estimation.

As described above, in the fifth embodiment, the same advantageous effect as that in the first embodiment is exhibited. Specifically, the own-vehicle position and the angle can be estimated with high accuracy on the basis of the unification environment information transmitted from the position estimation device, even if the vehicle itself is not mounted with any expensive sensor such as a satellite positioning sensor.

In addition, the position estimation device according to the fifth embodiment further includes: a reliability calculation unit which calculates a reliability for each environment recognition device or each sensor provided thereto; a reliability comparison unit which compares the calculated reliabilities with each other; a checking operation instruction creation unit which creates, for the mobile object, an instruction to perform a checking operation; and an operation checking unit which checks whether the operation specified in the instruction created by the checking operation instruction creation unit has been executed. When it is determined that the value of the highest reliability among the calculated reliabilities is smaller than the third reference value, the checking operation instruction creation unit creates a checking operation instruction for increasing the reliability, the operation checking unit confirms that the operation specified in the instruction created by the checking operation instruction creation unit has been executed, and furthermore, the reliability calculation unit re-calculates the reliability. Consequently, the reliability can be improved, and highly-accurate position estimation can be performed.

Further, if the recognition unit 22 of the position estimation device 2 includes the vehicle position prediction unit 224 which predicts a future position of the vehicle 3 as shown in the third embodiment, the improvement in the reliability leads to further improvement also in the accuracy of predicting a future position of the vehicle.

Other Embodiments (1) The traffic control system 1 according to the present disclosure includes: any of the position estimation devices 2 described in the first to fifth embodiments; the vehicle 3 to be controlled; and the environment recognition devices 4 which transmit pieces of surrounding environment information X about the vehicle 3 to the position estimation device 2 and which are installed on the roadside of a route on which the vehicle 3 travels. Further, communication is performed at least between the position estimation device 2 and the environment recognition device 4 and between the position estimation device 2 and the vehicle 3. The position estimation device 2 receives, from the environment recognition devices 4, the pieces of surrounding environment information X each including at least a position, a posture (an orientation or an angle), and a speed of the vehicle within the detection range S of the corresponding environment recognition device 4, generates unification environment information Za from the pieces of surrounding environment information X, and transmits the unification environment information Za to the vehicle. Consequently, the vehicle 3 can acquire an own position estimated with high accuracy, even if the vehicle 3 itself is not mounted with any device for measuring the own position thereof. In the vehicle 3, information about this own position, and furthermore information about an obstacle or the like on the travel route included in the unification environment information Za, are used so that the control unit 32 generates a control signal regarding the speed, steering, or the like of the own vehicle. Consequently, any of vehicle-driving actuators such as the brake and the steering wheel is controlled to be driven.

If the vehicle 3 can perform automated-driving travel corresponding to level 3 or 4 defined by, for example, SAE International, the vehicle 3 can achieve a desired automated-driving travel on the basis of the unification environment information Za including the own position and acquired from the position estimation device 2.

(2) Although an example in which the vehicle 3 itself is not mounted with any device for measuring the own position thereof has been described in each of the first to fifth embodiments, the vehicle 3 may be mounted with an advanced own-position measurement device. If an error of the own-position measurement device is decreased on the basis of the unification environment information Za including an own position acquired from the position estimation device 2, the vehicle can be stably controlled.

(3) An example of the hardware configuration for implementing the position estimation device 2 according to the first embodiment is shown in FIG. 4, and a hardware configuration for implementing each of the position estimation devices 2 according to the second to fifth embodiments is also the same as that shown as an example in FIG. 4.

(4) In the traffic control system 1, the following types of communications are used: a long-range communication and a short-range communication. As the long-range communication, a communication that conforms to a predetermined long-range wireless communication standard, e.g., the long term evolution (LTE) standard, or the 4G (fourth-generation mobile communication system) or 5G (fifth-generation mobile communication system) standard, is used. As the short-range communication, for example, dedicated short-range communications (DSRC) or the like is used, and use of the DSRC at the time of communication with another vehicle (vehicle-to-vehicle communication) makes it possible to acquire information about another vehicle near the own vehicle, although such a feature is not described in any of the above embodiments. For these communications, a certain communication speed is guaranteed.

For communication between the environment recognition device 4 and the position estimation device, the LTE or 5G standard is applied, for example.

In the vehicle 3, connection is established by using, for example, Control Area Network (registered trademark) (CAN) or the like.

(5) Although an automobile as a vehicle has been described as an example of the mobile object which is a control-target object, the mobile object to which the present disclosure is applicable is not limited to an automobile, and the present disclosure is applicable to various kinds of other mobile objects. The traffic control system can be used as, for example, a system that controls the behavior of a mobile object such as an in-building moving robot for performing inspection in a building, a line inspection robot, or a personal transporter. If the mobile object is one other than an automobile, information about an obstacle information detection unit provided in, for example, a building, a line, or a range within which a personal transporter is movable may be used as information to be acquired by the environment recognition device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

Hereinafter, modes of the present disclosure are summarized as additional notes.

(Additional Note 1)

A position estimation device comprising:

an information reception unit which receives, from each of a plurality of environment information acquisition devices, surrounding environment information including first mobile object information including at least a position, an angle, and a speed of a mobile object and road information including at least information about a white line near the mobile object;

a recognition unit which unifies received pieces of the surrounding environment information so as to create unification environment information including positional information about the mobile object;

an information recording unit which records the surrounding environment information including the first mobile object information and the road information received by the information reception unit, and the unification environment information created by the recognition unit; and an information transmission unit which transmits the unification environment information created by the recognition unit to the mobile object.

(Additional Note 2)

The position estimation device according to additional note 1, wherein the information reception unit receives second mobile object information including at least a target route, a target vehicle speed, a position, and a posture from the mobile object, the recognition unit includes a reliability calculation unit which calculates a reliability for each of the environment information acquisition devices having acquired the pieces of the surrounding environment information, and reliabilities of pieces of the second mobile object information, and a reliability comparison unit which compares the calculated reliabilities with each other, the reliability comparison unit selects the unification environment information from the environment information acquisition device having a highest reliability, or the second mobile object information having the highest reliability, and the information transmission unit transmits, as the positional information, the information selected by the reliability comparison unit to the mobile object.

(Additional Note 3)

The position estimation device according to additional note 2, wherein when a value of the highest reliability is smaller than a preset first reference value, the reliability comparison unit of the recognition unit creates correction information including at least the positional information about the mobile object and outputs the correction information together with the selected unification environment information from the environment information acquisition device having the highest reliability, or the selected second mobile object information having the highest reliability.

(Additional Note 4)

The position estimation device according to additional note 3, wherein the recognition unit further includes a vehicle position prediction unit which predicts a future position of the mobile object, and, when the reliability comparison unit determines that the value of the highest reliability is equal to or larger than the preset first reference value, the vehicle position prediction unit performs prediction as to whether or not the future position of the mobile object and the target route will be consistent with each other, on the basis of any of the second mobile object information, map information, and a travel route history recorded in the information recording unit, and, when predicting that the future position of the mobile object and the target route will be inconsistent with each other, creates correction information including at least the positional information about and the angle of the mobile object.

(Additional Note 5)

The position estimation device according to any one of additional notes 1 to 4, wherein the recognition unit further includes a reliability calculation unit which calculates a reliability for each of the environment information acquisition devices having acquired the pieces of the surrounding environment information and reliabilities of pieces of second mobile object information, a reliability comparison unit which compares the calculated reliabilities with each other, and a detection range changing instruction creation unit which creates an instruction to change a detection range of the environment information acquisition device, the reliability comparison unit determines, through comparison, whether or not a value of a highest reliability among the calculated reliabilities is smaller than a second reference value, and when it is determined that the value of the reliability is smaller than the second reference value, the detection range changing instruction creation unit creates the instruction to change the detection range of the environment information acquisition device.

(Additional Note 6)

The position estimation device according to any one of additional notes 1 to 4, wherein the recognition unit further includes a reliability calculation unit which calculates a reliability for each of the environment information acquisition devices having acquired the pieces of the surrounding environment information and reliabilities of pieces of second mobile object information, a reliability comparison unit which compares the calculated reliabilities with each other, a checking operation instruction creation unit which creates, for the mobile object, an instruction to perform a checking operation, and an operation checking unit which checks whether the operation specified in the instruction created by the checking operation instruction creation unit has been executed, the reliability comparison unit determines, through comparison, whether or not a value of a highest reliability among the calculated reliabilities is smaller than a third reference value, when it is determined that the value of the reliability is smaller than the third reference value, the checking operation instruction creation unit creates a checking operation instruction for increasing the reliability, the operation checking unit confirms that the operation specified in the instruction created by the checking operation instruction creation unit has been executed, and the reliability calculation unit re-calculates the reliability.

(Additional Note 7)

A traffic control system comprising:

the position estimation device according to any one of additional notes 1 to 6;

the plurality of environment information acquisition devices; and the mobile object, wherein communication is performed between the position estimation device and the plurality of environment information acquisition devices and between the position estimation device and the mobile object, and the mobile object acquires an own position on the basis of the positional information received from the position estimation device, and travels on the basis of the unification environment information and the own position.

DESCRIPTION OF THE REFERENCE CHARACTERS

1 traffic control system
2 position estimation device
21 information reception unit
22 recognition unit
221 information unification unit
222 reliability calculation unit
223 reliability comparison unit
224 vehicle position prediction unit
225 detection range changing instruction creation unit
226 checking operation instruction creation unit
227 operation checking unit
23 information transmission unit
24 information recording unit
3 vehicle
3*b* another vehicle
31 information reception unit
32 control unit
33 own-information acquisition unit
34 dead reckoning unit
35 information transmission unit
4 environment recognition device
41 environment information acquisition unit
42 communication unit
201 processor
202 memory
203 auxiliary storage device
204 transmission device
205 reception device
S detection range
X surrounding environment information
Y control object information
Za unification environment information
Zb reliability information
Zc correction information
Zd detection range changing information
Ze checking operation instruction

What is claimed is:

1. A position estimation device comprising:

an information reception circuitry which receives, from each of a plurality of environment information acquisition devices, surrounding environment information including first mobile object information including at least a position, an angle, and a speed of a mobile object and road information including at least information about a white line near the mobile object;

a recognition circuitry which unifies received pieces of surrounding the environment information so as to create unification environment information including positional information about the mobile object;

an information recording circuitry which records the surrounding environment information including the first mobile object information and the road information received by the information reception circuitry, and the unification environment information created by the recognition circuitry; and an information transmission circuitry which transmits the unification environment information created by the recognition circuitry to the mobile object.

2. The position estimation device according to claim 1, wherein the information reception circuitry receives second mobile object information including at least a target route, a target vehicle speed, a position, and a posture from the mobile object, the recognition circuitry includes a reliability calculation circuitry which calculates a reliability for each of the environment information acquisition devices having acquired the pieces of the surrounding environment information, and reliabilities of pieces of the second mobile object information, and a reliability comparison circuitry which compares the calculated reliabilities with each other, the reliability comparison circuitry selects the unification environment information from the environment information acquisition device having a highest reliability, or the second mobile object information having the highest reliability, and the information transmission circuitry transmits, as the positional information, the information selected by the reliability comparison circuitry to the mobile object.

3. The position estimation device according to claim 2, wherein when a value of the highest reliability is smaller than a preset first reference value, the reliability comparison circuitry of the recognition circuitry creates correction information including at least the positional information about the mobile object and outputs the correction information together with the selected unification environment information from the environment information acquisition device having the highest reliability, or the selected second mobile object information having the highest reliability.

4. The position estimation device according to claim 3, wherein the recognition circuitry further includes a vehicle position prediction circuitry which predicts a future position of the mobile object, and, when the reliability comparison circuitry determines that the value of the highest reliability is equal to or larger than the preset first reference value, the vehicle position prediction circuitry performs prediction as to whether or not the future position of the mobile object and the target route will be consistent with each other, on the basis of any of the second mobile object information, map information, and a travel route history recorded in the information recording circuitry, and, when predicting that the future position of the mobile object and the target route will be inconsistent with each other, creates correction information including at least the positional information about and the angle of the mobile object.

5. The position estimation device according to claim 1, wherein the recognition circuitry further includes a reliability calculation circuitry which calculates a reliability for each of the environment information acquisition devices having acquired the pieces of the surrounding environment information and reliabilities of pieces of second mobile object information, a reliability comparison circuitry which compares the calculated reliabilities with each other, and a detection range changing instruction creation circuitry which creates an instruction to change a detection range of the environment information acquisition device, the reliability comparison circuitry determines, through comparison, whether or not a value of a highest reliability among the calculated reliabilities is smaller than a second reference value, and when it is determined that the value of the reliability is smaller than the second reference value, the detection range changing instruction creation circuitry creates the instruction to change the detection range of the environment information acquisition device.

6. The position estimation device according to claim 1, wherein the recognition circuitry further includes a reliability calculation circuitry which calculates a reliability for each of the environment information acquisition devices having acquired the pieces of the surrounding environment information and reliabilities of pieces of second mobile object information, a reliability comparison circuitry which compares the calculated reliabilities with each other, a checking operation instruction creation circuitry which creates, for the mobile object, an instruction to perform a checking operation, and an operation checking circuitry which checks whether the operation specified in the instruction created by the checking operation instruction creation circuitry has been executed, the reliability comparison circuitry determines, through comparison, whether or not a value of a highest reliability among the calculated reliabilities is smaller than a third reference value, when it is determined that the value of the reliability is smaller than the third reference value, the checking operation instruction creation circuitry creates a checking operation instruction for increasing the reliability, the operation checking circuitry confirms that the operation specified in the instruction created by the checking operation instruction creation circuitry has been executed, and the reliability calculation circuitry re-calculates the reliability.

7. A traffic control system comprising:

the position estimation device according to claim 1;

the plurality of environment information acquisition devices; and the mobile object, wherein communication is performed between the position estimation device and the plurality of environment information acquisition devices and between the position estimation device and the mobile object, and the mobile object acquires an own position on the basis of the positional information received from the position estimation device, and travels on the basis of the unification environment information and the own position.

8. A traffic control system comprising:

the position estimation device according to claim 2;

the plurality of environment information acquisition devices; and the mobile object, wherein communication is performed between the position estimation device and the plurality of environment information acquisition devices and between the position estimation device and the mobile object, and the mobile object acquires an own position on the basis of the positional information received from the position estimation device, and travels on the basis of the unification environment information and the own position.

9. A traffic control system comprising:

the position estimation device according to claim 3;

the plurality of environment information acquisition devices; and the mobile object, wherein communication is performed between the position estimation device and the plurality of environment information acquisition devices and between the position estimation device and the mobile object, and the mobile object acquires an own position on the basis of the positional information received from the position estimation device, and travels on the basis of the unification environment information and the own position.

10. A traffic control system comprising:

the position estimation device according to claim 4;

the plurality of environment information acquisition devices; and the mobile object, wherein communication is performed between the position estimation device and the plurality of environment information acquisition devices and between the position estimation device and the mobile object, and the mobile object acquires an own position on the basis of the positional information received from the position estimation device, and travels on the basis of the unification environment information and the own position.

11. A traffic control system comprising:

the position estimation device according to claim 5;

the plurality of environment information acquisition devices; and the mobile object, wherein communication is performed between the position estimation device and the plurality of environment information acquisition devices and between the position estimation device and the mobile object, and the mobile object acquires an own position on the basis of the positional information received from the position estimation device, and travels on the basis of the unification environment information and the own position.

12. A traffic control system comprising:

the position estimation device according to claim 6;

the plurality of environment information acquisition devices; and the mobile object, wherein communication is performed between the position estimation device and the plurality of environment information acquisition devices and between the position estimation device and the mobile object, and the mobile object acquires an own position on the basis of the positional information received from the position estimation device, and travels on the basis of the unification environment information and the own position.

* * * * *